(12) United States Patent
Salem

(10) Patent No.: US 11,109,242 B2
(45) Date of Patent: Aug. 31, 2021

(54) QOS DIFFERENTIATION METHOD FOR DISTRIBUTED NETWORK-ASSISTED FBE-COMPLIANT UE COOPERATION IN UNLICENSED SPECTRUM

(71) Applicant: Huawei Technologies Co., Ltd., Shenzhen (CN)

(72) Inventor: Mohamed Adel Salem, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/869,086

(22) Filed: May 7, 2020

(65) Prior Publication Data

US 2020/0267565 A1 Aug. 20, 2020

Related U.S. Application Data

(63) Continuation of application No. 16/415,718, filed on May 17, 2019, now Pat. No. 10,652,755, which is a
(Continued)

(51) Int. Cl.
*H04W 16/14* (2009.01)
*H04W 76/14* (2018.01)
(Continued)

(52) U.S. Cl.
CPC ........... *H04W 16/14* (2013.01); *H04L 12/189* (2013.01); *H04L 43/12* (2013.01); *H04W 16/26* (2013.01);
(Continued)

(58) Field of Classification Search
CPC ..... H04W 16/14; H04W 76/14; H04W 16/26; H04W 24/08; H04W 72/085;
(Continued)

(56) References Cited

U.S. PATENT DOCUMENTS

2006/0209703 A1\* 9/2006 Baker ................... H04W 52/18
370/252
2010/0054154 A1\* 3/2010 Lambert ............. H04L 41/0886
370/254
(Continued)

FOREIGN PATENT DOCUMENTS

CN 105101307 A 11/2015
CN 105846882 A 8/2016
(Continued)

OTHER PUBLICATIONS

"14 UE Procedures Related to Sidelink," Release 13, 3GPP TS 36.213 V13.1.1, Mar. 2016, 19 pages.
(Continued)

*Primary Examiner* — Christopher M Brandt
(74) *Attorney, Agent, or Firm* — Slater Matsil, LLP

(57) ABSTRACT

Methods and devices are provided to enable a cooperating group of user equipments (UEs) to access a second spectrum band as frame based equipment (FBE) for device-to-device (D2D) sidelink transmission within the group. In an embodiment, a UE operating as a cooperating UE (CUE) in a cooperating group of UEs receives a group-specific CPC message from the network over a first spectrum band, the group-specific CPC message comprising information related to channel access for transmission of traffic intended for a target UE (TUE). The UE receives traffic intended for the TUE from the network over the first spectrum band and accesses a second spectrum band as FBE in accordance with a set of channel access parameters corresponding to the traffic to relay the traffic to the TUE via D2D sidelink transmission over the second spectrum band.

20 Claims, 17 Drawing Sheets

Related U.S. Application Data continuation of application No. PCT/CN2017/117239, filed on Dec. 19, 2017, which is a continuation of application No. 15/386,733, filed on Dec. 21, 2016, now abandoned.

(51) Int. Cl.
*H04L 12/18* (2006.01)
*H04L 12/26* (2006.01)
*H04W 16/26* (2009.01)
*H04W 24/08* (2009.01)
*H04W 72/08* (2009.01)
*H04W 88/04* (2009.01)
*H04L 12/927* (2013.01)

(52) U.S. Cl.
CPC ......... *H04W 24/08* (2013.01); *H04W 72/085* (2013.01); *H04W 76/14* (2018.02); *H04L 47/805* (2013.01); *H04W 88/04* (2013.01)

(58) Field of Classification Search
CPC ............... H04W 88/04; H04W 74/006; H04W 74/0808; H04L 12/189; H04L 43/12; H04L 47/805
See application file for complete search history.

(56) References Cited

U.S. PATENT DOCUMENTS

| | | | | |
|---|---|---|---|---|
| 2013/0322388 | A1* | 12/2013 | Ahn | H04W 76/14 370/329 |
| 2014/0171062 | A1* | 6/2014 | Fallgren | H04W 40/22 455/422.1 |
| 2014/0171094 | A1* | 6/2014 | Noh | H04W 40/22 455/452.1 |
| 2015/0117377 | A1 | 4/2015 | Maaref et al. | |
| 2016/0036565 | A1 | 2/2016 | Maaref et al. | |
| 2016/0050686 | A1* | 2/2016 | Krishnamoorthi | H04W 28/04 455/418 |
| 2016/0073288 | A1* | 3/2016 | Patil | H04W 28/0289 370/230 |
| 2016/0094975 | A1* | 3/2016 | Sheng | H04W 8/005 370/216 |
| 2016/0095128 | A1 | 3/2016 | Cao et al. | |
| 2016/0135208 | A1* | 5/2016 | Choi | H04W 76/40 370/329 |
| 2016/0205695 | A1* | 7/2016 | Kishiyama | H04J 11/004 370/315 |
| 2016/0234754 | A1* | 8/2016 | Baghel | H04W 72/1289 |
| 2016/0323891 | A1 | 11/2016 | Zhang et al. | |
| 2017/0086114 | A1* | 3/2017 | Jung | H04B 17/327 |
| 2017/0202043 | A1* | 7/2017 | Seo | H04W 76/14 |
| 2017/0353971 | A1* | 12/2017 | Gupta | H04W 72/1289 |
| 2018/0035454 | A1* | 2/2018 | Vitthaladevuni | H04L 5/006 |
| 2018/0070400 | A1* | 3/2018 | Wu | H04W 8/005 |
| 2018/0146494 | A1* | 5/2018 | Khoryaev | H04W 76/23 |
| 2018/0199312 | A1* | 7/2018 | Wu | H04W 72/0413 |
| 2018/0332491 | A1* | 11/2018 | Eckardt | H04W 76/14 |
| 2019/0261413 | A1* | 8/2019 | Fodor | H04W 74/0808 |
| 2020/0059962 | A1* | 2/2020 | Tejedor | H04W 16/14 |

FOREIGN PATENT DOCUMENTS

| | | |
|---|---|---|
| CN | 105992384 A | 10/2016 |
| WO | 2016072909 A1 | 5/2016 |
| WO | 2016120436 A1 | 8/2016 |

OTHER PUBLICATIONS

Huawei, et al., "Discussion on the application of LBT options in eLAA," 3GPP TSG RAN WG1 84bis Meeting, R1-162602, Busan, Korea, Apr. 11-15, 2016, 3 pages.

Huawei, et al., "Sidelink Support and Enhancements for NR," 3GPP TSG RAN WG1 Meeting #86, R1-167207, Gothenburg, Sweden, Aug. 22-26, 2016, 7 pages.

Kyocera, "LAA UL Design," 3GPP TSG RAN WG1 Meeting #81, R1-153104, Fukuoka, Japan, May 25-29, 2015, 3 pages.

* cited by examiner

| TUE QoS Priority Class | SL MCOT | | | | | | Min. Idle Period [ms] | Min. FP [ms] | Min. FP [Subframes] | Min. FP [Slots] | Min. FP [Symbols] |
|---|---|---|---|---|---|---|---|---|---|---|---|
| | Corresponding PDSCH MCOT | Max. SL Burstlength | | RFSD [µs] | SIFS [µs] | SL-End+CLPC [Symbols] | | | | | |
| | | Max. Useful SL Burst [Symbols] | | | | | | | | | |
| 1 | 2ms | 24 | | 55.429 | 16 | 3 | 0.100 | 2.100 | 3 | 5 | 30 |
| 2 | 3ms | 38 | | 55.429 | 16 | 3 | 0.150 | 3.150 | 4 | 7 | 45 |
| 3 | 8ms | 108 | | 55.429 | 16 | 3 | 0.400 | 8.400 | 9 | 17 | 118 |
| 3 | 10ms | 136 | | 55.429 | 16 | 3 | 0.500 | 10.500 | 11 | 21 | 147 |
| 4 | 8ms | 108 | | 55.429 | 16 | 3 | 3.200 | 11.200 | 12 | 23 | 157 |
| 4 | 10ms | 136 | | 55.429 | 16 | 3 | 4.00 | 14.000 | 14 | 28 | 196 |

TABLE 1.

← Less Latency
→ Larger Traffic Volume

FIG. 4

| TUE QoS Priority Class | SL MCOT | | | | | Min. Idle Period [ms] | Min. FP [ms] | Min. FP [Subframes] | Min. FP [Slots] | Min. FP [Symbols] |
|---|---|---|---|---|---|---|---|---|---|---|
| | Corresponding PDSCH MCOT | Max. SL Burstlength | | | SL-End+CLPC [Symbols] | | | | | |
| | | Max. Useful SL Burst [Symbols] | RFSD [µs] | SIFS [µs] | | | | | | |
| 1 | 2ms | 25 | 55.429 | 16 | 2 | 0.100 | 2.100 | 3 | 5 | 30 |
| 2 | 3ms | 39 | 55.429 | 16 | 2 | 0.150 | 3.150 | 4 | 7 | 45 |
| 3 | 8ms | 109 | 55.429 | 16 | 2 | 0.400 | 8.400 | 9 | 17 | 118 |
| 3 | 10ms | 157 | 55.429 | 16 | 2 | 0.500 | 10.500 | 11 | 21 | 147 |
| 4 | 8ms | 109 | 55.429 | 16 | 2 | 3.200 | 11.200 | 12 | 23 | 157 |
| 4 | 10ms | 137 | 55.429 | 16 | 2 | 4.00 | 14.000 | 14 | 28 | 196 |

TABLE 2.

FIG. 6A

| TUE QoS Priority Class | SL MCOT | | | | | Min. Idle Period [ms] | Min. FP [ms] | Min. FP [Subframes] | Min. FP [Slots] | Min. FP [Symbols] |
|---|---|---|---|---|---|---|---|---|---|---|
| | Corresponding PDSCH MCOT | Max. SL Burstlength | | SIFS [μs] | SL-End+CLPC [Symbols] | | | | | |
| | | Max. Useful SL Burst [Symbols] | RFSD [μs] | | | | | | | |
| 1 | 2ms | 26 | 55.429 | 16 | 1 | 0.100 | 2.100 | 3 | 5 | 30 |
| 2 | 3ms | 40 | 55.429 | 16 | 1 | 0.150 | 3.150 | 4 | 7 | 45 |
| 3 | 8ms | 110 | 55.429 | 16 | 1 | 0.400 | 8.400 | 9 | 17 | 118 |
| | 10ms | 138 | 55.429 | 16 | 1 | 0.500 | 10.500 | 11 | 21 | 147 |
| 4 | 8ms | 110 | 55.429 | 16 | 1 | 3.200 | 11.200 | 12 | 23 | 157 |
| | 10ms | 138 | 55.429 | 16 | 1 | 4.00 | 14.000 | 14 | 28 | 196 |

TABLE 3.

FIG. 6B

| TUE QoS Priority Class | Corresponding PDSCH MCOT | SL MCOT | | | | | Min. Idle Period [ms] | Min. FP [ms] | Min. FP [Subframes] | Min. FP [Slots] | Min. FP [Symbols] |
|---|---|---|---|---|---|---|---|---|---|---|---|
| | | Max. SL Burstlength | | | SIFS [µs] | SL-End+CLPC [Symbols] | | | | | |
| | | Max. Useful SL Burst [Symbols] | RFSD [µs] | | | | | | | | |
| 1 | 2ms | 28 | 0.000 | | 0 | 0 | 0.100 | 2.100 | 3 | 5 | 30 |
| 2 | 3ms | 42 | 0.000 | | 0 | 0 | 0.150 | 3.150 | 4 | 7 | 45 |
| 3 | 8ms | 112 | 0.000 | | 0 | 0 | 0.400 | 8.400 | 9 | 17 | 118 |
| | 10ms | 140 | 0.000 | | 0 | 0 | 0.500 | 10.500 | 11 | 21 | 147 |
| 4 | 8ms | 112 | 0.000 | | 0 | 0 | 3.200 | 11.200 | 12 | 23 | 157 |
| | 10ms | 140 | 0.000 | | 0 | 0 | 4.00 | 14.000 | 14 | 28 | 196 |

TABLE 4.

FIG. 6C

← Less Latency

Larger Traffic Volume →

| | | Max. SL Burstlength | | | | Min. Idle Period [ms] | Min. FP [ms] | Min. FP [Subframes] | Min. FP [Slots] | Min. FP [Symbols] |
|---|---|---|---|---|---|---|---|---|---|---|
| TUE QoS Priority Class | Max. Useful SL Burst [MS] | Max. Useful SL Burst [Symbols] | RFSD [µs] | SIFS [µs] | SL-End+CLPC [Symbols] | | | | | |
| | | SL MCOT | | | | | | | | |
| 1 | 1ms | 14 | 55.429 | 16 | 3 | 0.064 | 1.350 | 2 | 3 | 19 |
| 2 | 2ms | 28 | 55.429 | 16 | 3 | 0.114 | 2.400 | 3 | 5 | 34 |
| 3 | 4ms | 56 | 55.429 | 16 | 3 | 0.214 | 4.500 | 5 | 9 | 63 |
| 4 | 8ms | 112 | 55.429 | 16 | 3 | 0.414 | 8.700 | 9 | 18 | 122 |

TABLE 5.

FIG. 8

← Less Latency
Larger Traffic Volume →

QOS DIFFERENTIATION METHOD FOR DISTRIBUTED NETWORK-ASSISTED FBE-COMPLIANT UE COOPERATION IN UNLICENSED SPECTRUM

CROSS-REFERENCE TO RELATED APPLICATIONS

This application is a continuation of U.S. application Ser. No. 16/415,718, filed on May 17, 2019, entitled "QoS Differentiation Method for Distributed Network-Assisted FBE-Compliant UE Cooperation in Unlicensed Spectrum" which is a continuation of PCT Patent Application No. PCT/CN2017/117239, filed Dec. 19, 2017, entitled "A Quality of Service Differentiation Method for Distributed Network-Assisted Frame Based Equipment Compliant User Equipment Cooperation in Unlicensed Spectrum," which claims priority to U.S. patent application Ser. No. 15/386,733, filed Dec. 21, 2016, entitled "A Quality of Service Differentiation Method for Distributed Network-Assisted Frame Based Equipment Compliant User Equipment Cooperation in Unlicensed Spectrum," all of which applications are hereby incorporated by reference herein in their entireties.

TECHNICAL FIELD

The application relates to systems and methods of network-assisted distributed user equipment cooperation in unlicensed spectrum.

BACKGROUND

In a radio access network, a network may form a logical/virtual/hyper user equipment (UE) mesh entity, hereinafter Hyper UE, consisting of a group/cluster of UEs in close proximity, capable of sidelink device-to-device (D2D) short-range communications, to help boost coverage and spectral efficiency. UEs form a Hyper UE that acts as a single distributed virtual transceiver with respect to the network. The network communicates with the distributed virtual transceiver through a first access link air interface designed for uplink and/or downlink communications.

A Hyper UE consists of at least one target UE (TUE) and a set of cooperating UEs (CUEs). CUEs help TUEs communicate with the network, for example by receiving data on the downlink and/or transmitting data on the uplink using the access link air interface by acting as UE relays between the network and the TUEs

SUMMARY

One aspect of the present disclosure provides a method in user equipment (UE). In the method, the UE operates in a cooperation mode, in which the UE acts a cooperating UE (CUE) in a cooperating group of UEs for a target UE (TUE). In the cooperation mode, the UE: receives a group-specific common-parameters configuration (CPC) message from a transmit point (TP) over a first spectrum band, the group-specific CPC message comprising information related to a priority class index associated with traffic intended for the TUE; receives traffic intended for the TUE from the TP over the first spectrum band; and accesses a second spectrum band as frame based equipment (FBE) in accordance with a priority class index-specific set of channel access parameters corresponding to the priority class index associated with the traffic intended for the TUE to relay the traffic to the TUE via device-to-device (D2D) sidelink transmission over the second spectrum band.

In some embodiments, the information related to a priority class index associated with traffic intended for the TUE comprises at least one of: the priority class index associated with the traffic intended for the TUE; and at least a subset of the channel access parameters of the priority class index-specific set of channel access parameters.

Optionally, the group-specific CPC message further comprises information indicating a selected channel in the second spectrum band for CUEs in the group to access as frame based equipment (FBE) to relay traffic to the TUE.

In some embodiments, the priority class index-specific set of channel access parameters corresponding to the priority class index associated with traffic intended for the TUE comprises a maximum sidelink burst length parameter and a minimum frame period parameter.

In some embodiments, the group-specific CPC message further comprises information indicating a reference time point, $t_0$, to start cycles of the frame period for accessing the second spectrum band as FBE, and the method further comprises setting the frame period for accessing the second spectrum band as FBE according to the minimum frame period parameter and starting a cycle of the frame period at the reference time point, $t_0$.

In some embodiments, accessing the second spectrum band as FBE comprises starting a clear channel assessment (CCA) process at a predetermined amount of time in advance of a start time of a cycle of the frame period for accessing the second spectrum band as FBE.

In some embodiments, the predetermined amount of time is a point coordination function inter-frame space (PIFS) interval that is at most 25 μs long.

In some embodiments, accessing the second spectrum band as FBE further comprises, in response to the CCA process indicating that a channel in the second spectrum band that has been assigned to the group is available, transmitting, over the available channel in the second spectrum band, a sidelink burst in accordance with the maximum sidelink burst length parameter, the sidelink burst including at least a portion of the received traffic intended for the TUE.

In some embodiments, the method further comprises receiving traffic intended for the TUE from at least one other TP over the first spectrum band, wherein transmitting, over the available channel in the second spectrum band, a sidelink burst in accordance with the maximum sidelink burst length parameter comprises either augmenting the traffic received from different TPs in the payload of the sidelink burst or multiplexing the traffic received from different TPs in the frequency domain or the time domain.

Optionally, the sidelink burst spans a majority of the bandwidth of the available channel and is orthogonal to other in-group synchronous sidelink bursts transmitted by other CUEs in the group.

Optionally, accessing the second spectrum band as FBE further comprises, in response to the CCA process indicating that a channel in the second spectrum band that has been assigned to the group is not available, restarting the CCA process at the predetermined amount of time in advance of the start time of the next cycle of the frame period.

In some embodiments, the method further comprises, in response to receiving a probing beacon request message from the TP over the first spectrum band, the probing beacon request message identifying the TUE and a granted time instant, measuring a received signal strength of a probing beacon transmitted by the TUE on a channel in the second spectrum band at the granted time instant.

In some embodiments, the method further comprises in response to receiving a probing beacon feedback polling message from the TP over the first spectrum band, transmitting a probing response message to the TP over the first spectrum band, the probing response message comprising probing feedback information indicating received signal strengths of probing beacons transmitted by TUEs, including the TUE of the instant cooperating group of UEs, and corresponding TUE identifiers (TUE IDs).

In some embodiments, the first spectrum band is a licensed spectrum band and the second spectrum band is an unlicensed spectrum band.

In some embodiments, the UE operates in a target mode, in which the UE acts as a target UE (TUE) in a cooperating group of UEs that includes the TUE and at least one cooperating UE (CUE). In the target mode: in response to receiving a probing beacon request message from a TP over the first spectrum band, the probing beacon request message including information indicating grant of a time instant to the TUE to transmit a probing beacon on a channel in the second spectrum band, the UE initiates a clear channel assessment (CCA) a predetermined time in advance of the granted time instant; and in response to the CCA indicating that the channel is available, the UE broadcasts the probing beacon on the channel in the second spectrum band at the granted time instant.

Optionally, in the target mode, in response to the CCA indicating that the channel is not available, the UE transmits a rescheduling request to the TP over the first spectrum band, the rescheduling request requesting that the TUE's granted time instant for transmission of the probing beacon be rescheduled.

In some embodiments, in the target mode, in response to receiving a probing beacon request message from the TP over the first spectrum band, the probing beacon request message indicating grant of a time instant to another TUE to transmit a probing beacon on a channel in the second spectrum band, the UE: measures a received signal strength of a probing beacon broadcasted by the other TUE on the channel in the second spectrum band at the granted time instant; and stores a record of measured received signal strengths of probing beacons transmitted by other TUEs and corresponding TUE IDs.

In some embodiments, in the target mode, in response to receiving a polling message from the TP over the first spectrum band, the UE transmits a probing response message to the TP over the first spectrum band, the probing response message comprising probing feedback information based on the TUE's stored record of measured received signal strengths of probing beacons transmitted by other TUEs and corresponding TUE IDs.

Optionally, in the target mode, in response to detecting an end of the last of at least one sidelink transmission from the at least one CUE over the second spectrum band, the UE multi-casts a response message over the second spectrum band to the group, the response message indicating an end to sidelink transmission to the TUE.

In some embodiments, the multi-cast response message indicating an end to sidelink transmission to the TUE comprises symbols transmitted at a reference power level for sidelink channel measurement at the at least one CUE.

In some embodiments, multi-casting a response message over the second spectrum band to the group further comprises multi-casting closed-loop power control (CLPC) information for the at least one CUE.

Optionally, the CLPC information for the at least one CUE comprises, for each CUE, a dynamic CLPC command indicating a signed power offset to be applied to the transmit power of the CUE.

Optionally, each dynamic CLPC command comprises a code of at least two bits and there are more power decrement codes than power increment codes.

In some embodiments, multi-casting closed-loop power control (CLPC) information for the at least one CUE comprises multi-casting the CLPC information in response to receiving, over the second spectrum band, at least one sidelink transmission associated with a given hybrid automatic repeat request (HARQ) process identifier (ID), the CLPC information for the at least one CUE comprising, for each CUE that is assisting with the given HARQ process ID and from which a sidelink transmission was not received, a dynamic CLPC command to decrease the CUE's transmit power.

Another aspect of the present disclosure provides a user equipment (UE) configured to perform the method according to the above aspect of the present disclosure. For example, such a UE may include a wireless interface, a processor operatively coupled to the wireless interface, and a computer readable storage medium operatively coupled to the processor, the computer readable storage medium storing programming for execution by the processor that includes instructions for operating in the cooperation mode and/or the target mode according to the above aspect of the present disclosure.

BRIEF DESCRIPTION OF THE DRAWINGS

FIG. 4 is a table depicting Quality of Service (QoS) priority classes and associated channel access parameters in accordance with an embodiment of the present disclosure;

FIGS. 6A, 6B, and 6C are three tables depicting QoS priority classes and associated channel access parameters in accordance with three embodiments of the present disclosure;

FIG. 8 is FIG. 4 is a table depicting QoS priority classes and associated channel access parameters in accordance with another embodiment of the present disclosure;

DETAILED DESCRIPTION OF ILLUSTRATIVE EMBODIMENTS

Figure 1:
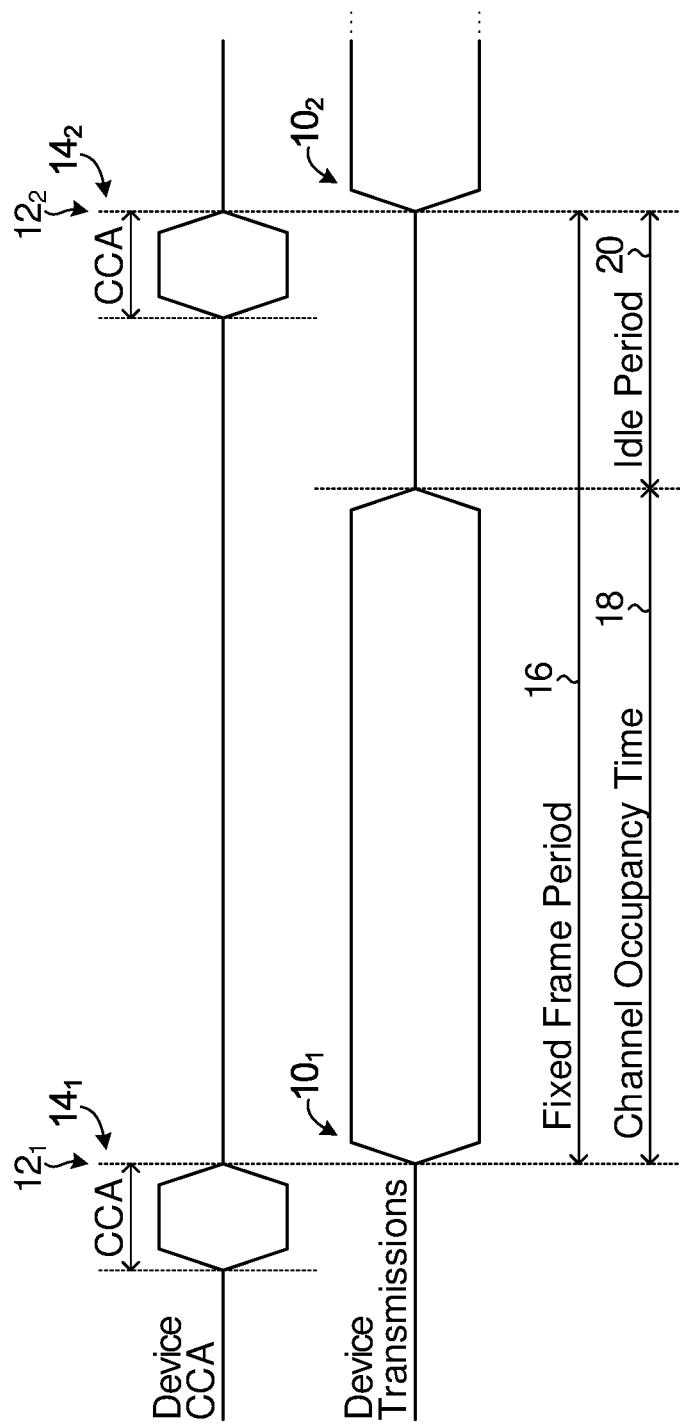
FIG. 1 is a timing diagram showing an example of a listen-before-talk (LBT) procedure in accordance with European regulatory requirements for frame based equipment (FBE)

Generally, embodiments of the present disclosure provide methods and apparatus for network-assisted distributed UE cooperation in unlicensed spectrum. Some embodiments of the present disclosure are directed to frame based equipment (FBE)-compliant UE cooperation. Other embodiments are directed to load based equipment (LBE) UE cooperation. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Leveraging the presence of many idle/active UEs in the vicinity of an active target UE (TUE), network-assisted UE cooperation has been proven to be an efficient solution to increase throughput and/or coverage of mobile broadband (MBB) networks.

Cost-efficiency of UE cooperation makes it a very attractive solution to MBB operators because the device-to-device (D2D) communications between the cooperating UEs (CUEs) and the TUE can be established without additional investments in the network's infrastructure, resulting in savings in capital expenditure (CAPEX).

Due to the proximity of cooperating UEs, and in the interest of reducing the impact on their battery life, low transmit power is typically used for D2D sidelink (SL) transmissions compared to the transmit powers that may be used for access links in the licensed spectrum. As such, out-of-band D2D communications can provide a low-complexity approach to SL transmissions that avoids strong interference from the network's infrastructure nodes that are operating in-band in the licensed spectrum.

Given the scarcity and expense of bandwidth in the licensed spectrum, exploiting the vast and free-of-charge unlicensed spectrum to carry the out-of-band D2D communications is an approach that has garnered interest from MBB operators. For example, there has been significant interest in the unlicensed 5 GHz spectrum in which many Wireless Local Area Networks (WLANs) operate. Accordingly, in order to operate in this spectrum, efficient and fair coexistence with WLANs along with compliance with region-specific unlicensed spectrum regulations may be necessary for a successful UE Cooperation mechanism in the unlicensed spectrum.

In network-assisted UE cooperation, the network can select for each TUE the best CUEs per potential serving transmit point (TP), optimize channel quality indicator (CQI) feedback across the selected CUEs and the TUE links, and configure the group comprising the TUE and its selected CUEs to communicate on an unlicensed channel as an aggregated component carrier (CC). However, distributed dynamic operation/medium access of individual UEs in the Hyper UE may avoid excessive latency, complexity, and signaling overheads.

When a D2D communication among the UEs of a Hyper UE takes place in the unlicensed spectrum, each individual UE performs a listen-before talk (LBT) operation (for example including initial clear channel assessment (ICCA) and an extended clear channel assessment (ECCA)) before accessing the unlicensed spectrum in order to check that the channel is idle before transmitting.

In regions such as Europe and Japan, devices attempting to access the unlicensed spectrum have to comply with either a Load Based Equipment (LBE) LBT procedure or a Frame Based Equipment (FBE) LBT procedure.

In the LBE LBT procedure, a device attempting to access the unlicensed spectrum can start transmitting at an arbitrary time after a successful CCA. The CCA mechanism employed in such LBE LBT procedures may be the same CCA mechanism employed in WLAN, i.e. carrier sense multiple access with collision avoidance (CSMA/CA), or it may be based on an energy-detection (ED)-based CCA. For example, an ED-based CCA may utilize a random backoff to determine the size of a contention window and a respective maximum channel occupancy (MCO) that determines the maximum amount of time that a device may transmit in the unlicensed spectrum once it has successfully contended for a transmission opportunity.

In FBE LBT procedures, a device attempting to access the unlicensed spectrum can start transmitting only at periodic instants after a short successful ED-based CCA.

FIG. 1 is a timing diagram showing an example of an LBT procedure in accordance with the European regulatory requirements set out in European Telecommunications Standards Institute (ETSI) EN 301 893 V1.7.1 for devices accessing unlicensed spectrum as FBE. As depicted in FIG. 1, a device accessing unlicensed spectrum as FBE starts transmissions $10_1$, $10_2$ over the unlicensed spectrum only at periodic instants $12_1$, $12_2$ after a short successful ED-based CCA $14_1$, $14_2$ indicating that a channel in the unlicensed spectrum is available. The minimum time between such periodic instants $12_1$, $12_2$ is the fixed frame period 16, which encompasses the channel occupancy time 18 of the transmission and an idle period 20. Under the regulatory requirements set out in ETSI EN 301 893 V1.7.1, the channel occupancy time 18 may be between 1 and 10 milliseconds (ms) and the idle period 20 must be at least 5% of the channel occupancy time 18, which means that the frame period 16 must be a minimum of 1.05 times the size of the channel occupancy time 18. In addition, under the regulatory requirements set out in ETSI EN 301 893 V1.7.1, devices employ an ED-based CCA in which a channel is determined to be busy if the total energy detected in the channel is greater than a CCA threshold value that is upper bounded by a function of the transmit power of the device. In particular, the upper bound of the CCA threshold has been regulated as follows:

$$CCA\ Threshold \geq -73 \frac{dBm}{MHz} + (23 - \max Tx\, EIRP)[dBm],$$

where max Tx EIRP is a device's maximum transmit equivalent isotropically radiated power (EIRP). As a result, the higher the max Tx power and/or the antenna gain, the lower the CCA threshold that is allowed. As such, an unlicensed spectrum access opportunity may depend on the result of the transmit power control mechanism that is used for unlicensed spectrum transmission. Under the regulatory requirements set out in ETSI EN 301 893 V1.7.1, the CCA period must be at least 20 microseconds (μs) long, with 25 μs being typical.

If every individual UE in a Hyper UE accessed the unlicensed spectrum individually, it would create delay and would deteriorate UE cooperation performance at least in terms of the delay for all individual devices to perform their own LBT operation. If CUEs perform independent LBT procedures, they may either start forwarding data or send a reservation signal to ensure that other devices do not occupy the channel before they are able to transmit. In both situations, if no coordination exists between CUEs in terms of aligning their CCA periods, sending of the reservation signals or starting of the data forwarding to the TUEs, then the channel may appear to be busy for the other CUEs within the group, which in turn will increase the latency of UE cooperation.

For example, in the CSMA/CA LBT procedure utilized in WiFi/WLAN, each device (e.g. WiFi access point (AP) or WiFi station (STA)) attempting to access the unlicensed spectrum independently generates a random backoff counter or contention window (CW) that is used to determine the length of an ECCA that is performed after an ICCA that is performed during an distributed coordination function interframe space (DIFS). In the CSMA/CA LBT procedure, if a CCA is terminated due to a 'busy' assessment, the backoff counter is frozen to maintain priority in the next access attempt. WiFi/WLAN APs or STAs of the same basic serving set (BSS) can block each other, because there is no synchronous group access in the CSMA/CA LBT procedure utilized in WiFi/WLAN. For a transmission from a source device to a destination device in WiFi/WLAN, if the source device successfully receives one or multiple medium access control protocol data units (MPDUs), e.g., an aggregated MPDU (AMPDU), an acknowledgement (ACK) signal is sent using a reliable modulation and coding scheme (MCS) from the destination device to the source device only. A time out for the transmission is detected by the source device if the source device does not receive/decode an ACK within a time frame defined by the duration of a short inter-frame space (SIFS) plus the duration of the ACK after the source device finishes the transmission.

The 3rd Generation Partnership Project (3GPP) Release 13 Long Term Evolution (LTE) specification provides a framework for Licensed Assisted Access (LAA) in unlicensed spectrum. The framework includes a Category 4 (CAT4) LBT procedure (LBT with random backoff or ECCA) that each device attempting to access the unlicensed spectrum must comply with. Similar to the LBT mechanism in CSMA/CA for WIFI/WLAN, in the 3GPP Release 13 CAT4 LBT mechanism each device independently generates a random backoff counter or contention window (CW), and if a CCA is terminated due to a 'busy' assessment, the backoff counter is frozen to maintain priority in the next access attempt. However, synchronous group access of neighboring small cell evolved Node Bs (eNBs) is supported in 3GPP Release 13 via backhaul connections by setting a common subframe start time for downlink (DL) transmissions from neighboring small cell eNBs. The eNB that finishes a successful CCA before the preset subframe starting point has to defer its transmission to that point. However, the eNB that has deferred its transmission cannot prevent WiFi or other LAA access during the defer time by transmitting a blank blocking/reservation signal because this will likely cause the ongoing CCAs of in-group eNBs to fail.

Method and apparatus for network-assisted distributed FBE-compliant UE cooperation in unlicensed spectrum are provided that may mitigate one or more of the disadvantages of the approaches described above. In some embodiments, UEs in the same Hyper UE synchronize their LBT procedure in order to be able to access the unlicensed spectrum simultaneously.

Figure 2:
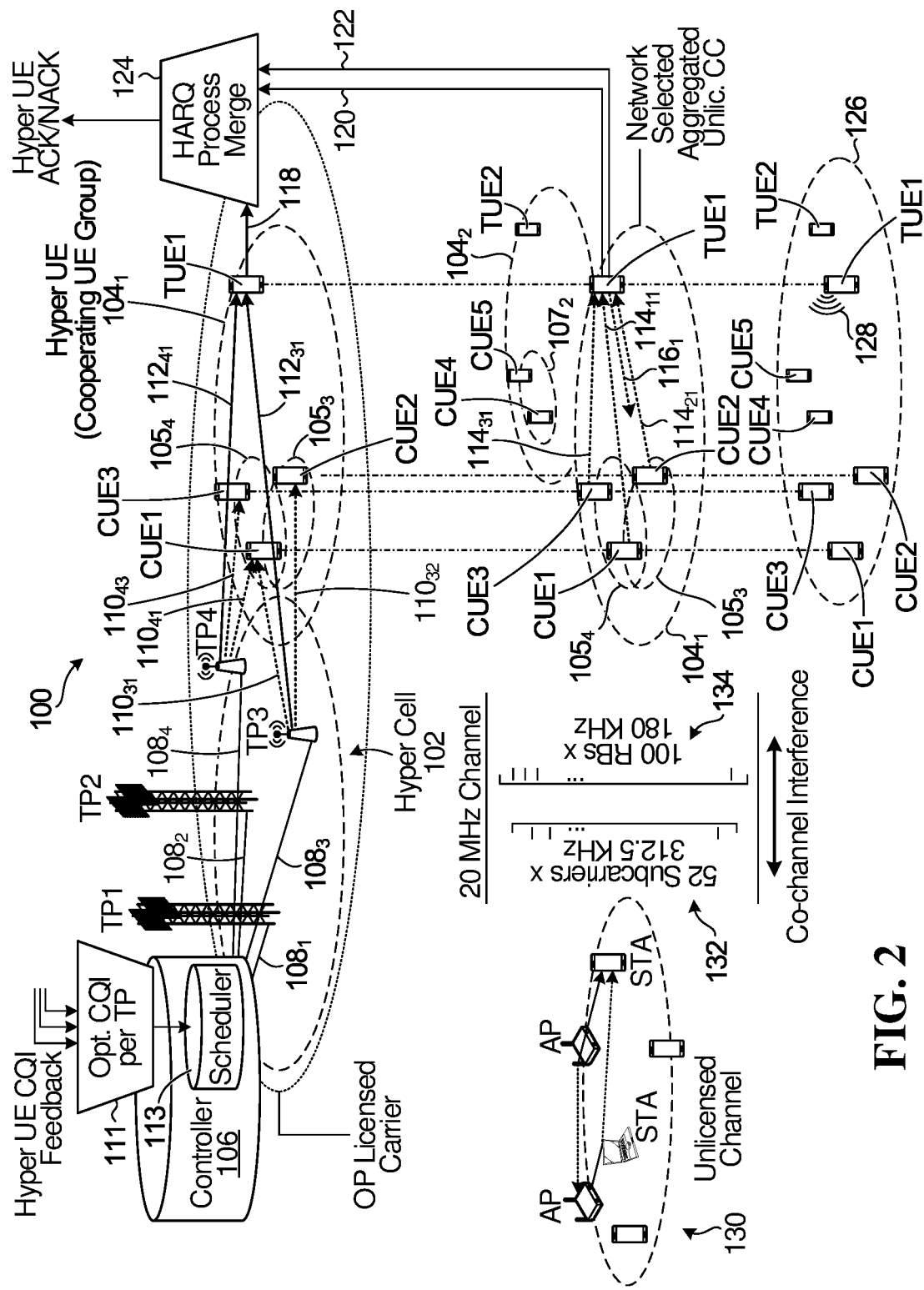
FIG. 2 is a block diagram of a network containing a cooperating UE group in accordance with an embodiment of the present disclosure.

FIG. 2 depicts an example of how UEs in close proximity can be grouped into Hyper UEs (cooperation groups) that behave as distributed transceivers, and perform coordinated contention procedures as FBE, in accordance with an embodiment of the present disclosure. Shown in FIG. 2 is a portion of a network wo that includes a Hyper Cell (group of cooperating transmit points (TPs)) 102, a Hyper UE $104_1$ and a network controller 106. Hyper Cell 102 includes four transmit points TP1, TP2, TP3 and TP4 each having a respective backhaul connection $108_1$, $108_2$, $108_3$, $108_4$ to controller 106. Hyper UE $104_1$ includes four UEs CUE1, CUE2, CUE3, and TUE1. TUE1 is the intended destination of signals transmitted from the network TPs, e.g. TP3 and TP4, towards the Hyper UE $104_1$. CUE1, CUE2 and CUE3 are CUEs that help TUE1 in communicating with the network using D2D sidelinks for short-range communications within the Hyper UE $104_1$. In doing so, the CUEs effectively act as Network-to-UE relays towards TUE1. Information sent or relayed by CUEs to TUEs depends on the cooperation strategy, e.g. amplify-and-forward (AF), decode-and-forward (DF), compress-and-forward (CF), (frequency-selective) soft-forwarding (SF), joint reception (JR). CUE1, CUE2 and CUE3 may have been selected from the set of active or idle devices within the neighborhood of TUE1.

The Hyper Cell 102 may serve multiple Hyper UEs. For example, as depicted in FIG. 2, Hyper Cell 102 may also server a second Hyper UE $104_2$ that includes CUE4, CUE5 and TUE2. CUE4 and CUE5 may be included in a subgroup $107_2$ served by TP2, for example. In FIG. 2, there is no overlap between the UEs that act as a CUE or TUE in Hyper UEs $104_1$ and $104_2$. In other embodiments, a UE may act as a CUE or TUE in multiple Hyper UEs. For example, a UE may act as a TUE in two Hyper UEs, where a first set of UEs having a first similar nominal decoding delay (NDD) act as CUEs for the TUE in a first of the two Hyper UEs, and another set of UEs having a second similar NDD that is different from the first similar NDD act as CUEs for the TUE in a second of the two Hyper UEs. As another example, in some embodiments, a UE may act as a CUE for a first TUE in a first Hyper UE and also act as a CUE for a second TUE in a second Hyper UE. It should also be noted that the UEs that are included in a Hyper UE, and their role within the Hyper UE, i.e. CUE or TUE, and the TPs in the Hyper Cell that serve the Hyper UE may change over time.

In some embodiments, before forming the Hyper UE $104_1$, network controller 106, via TPs TP1, TP2, TP3 and/or TP4, schedules TUE1, e.g., through an UL grant within a broadcast DL control message, to transmit a probing beacon on a channel in the unlicensed spectrum at a granted time and instructs other network cooperating UEs to listen to the channel at the granted time. The probing beacon transmitted by a TUE is a broadcast signal that carries the TUE identifier (TUE ID) of the source TUE. A probing beacon broadcast signal may have one or more of the following properties: the signal may have a known fixed transmit power per tone/ subcarrier; the signal may have a known fixed transport format; the signal may occupy a known configuration of physical resource elements. The channel on which a probing beacon is broadcasted may be a dedicated probing channel that is dedicated for probing beacon transmission and is not otherwise used for D2D communication. For example, network controller 106 may transmit, a polling beacon message over at least one of the backhaul connections $108_1$, $108_2$, $108_3$, $108_4$ to at least one of the TPs TP1, TP2, TP3, TP4 to cause the TP to broadcast, over the licensed band, a probing beacon request message that identifies TUE1 and a granted time instant for the transmission of a probing beacon. The probing beacon request message functions as a request to TUE1 to broadcast a probing beacon 128 on an unlicensed probing channel 126 at the granted time instant and as an instruction to the other network cooperating UEs, e.g., TUE2, CUE1, CUE2, CUE3, CUE4, CUE5, to listen to the unlicensed probing channel at the granted time instant.

In response to receiving the probing beacon request message, TUE1 attempts to access the dedicated probing channel by initiating a one-shot CCA a predetermined amount of time in advance of the granted time instant. In some embodiments, the one-shot CCA is an ED-based CCA with a 25 μs duration (equal to a point coordination function inter-frame space (PIFS)) that ends at the granted time instant. If the one-shot CCA fails, e.g., the energy detected by TUE1 on the unlicensed probing channel 126 is greater than the CCA threshold of TUE1, then TUE1 transmits a rescheduling request to the network via an uplink transmission to one or more of the TPs over the licensed spectrum band.

In response to receiving the probing beacon request message, the other network cooperating UEs, including other TUEs (e.g. TUE2), measure and store the received signal strength of the probing beacon 128 together with TUE1's TUE identifier (TUE ID).

In some embodiments, before forming the Hyper UE $104_1$, network controller 106 may also poll, via TPs TP1, TP2, TP3 and/or TP4, candidate CUEs to feedback their NDDs. For example, network controller 106 may transmit a message over at least one of the backhaul connections $108_1$, $108_2$, $108_3$, $108_4$ to at least one of the TPs TP1, TP2, TP3, TP4 to cause the TP to transmit a polling message, over the licensed band, to candidate CUEs, the polling message requesting the NDD feedback. For example, as shown in FIG. 2, TP3 may transmit a polling message to CUE1 and CUE2 over licensed access links $110_{31}$ and $110_{32}$, respectively, and TP4 may transmit a polling message to CUE1 and CUE3 over licensed access links $110_{41}$ and $110_{43}$, respectively. In some embodiments, the polling message is transmitted within a DL control transmission.

In some embodiments, network controller 106 forms the Hyper UE based at least in part on the NDD feedback from candidate CUEs. For example, in some embodiments, network controller 106 forms the Hyper UE $104_1$ by including CUEs with similar NDDs.

In some embodiments, network controller 106 selects the TP(s) and CUE(s) to serve a TUE based on channel quality indicator (CQI) feedback from the TPs. For example, as shown in FIG. 2, network controller 106 includes a scheduler 106 that schedules the TPs to serve Hyper UE $104_1$ based on CQI feedback (shown generally at 111 in FIG. 2) from each of the TPs TP1, TP2, TP3, TP4 for each of the UEs in Hyper UE $104_1$. In particular, for each candidate TP, the scheduler 106 processes CQI feedback from the TUE and the TUE's best longer-term-selected CUEs with the given TP, e.g., a first subgroup $105_3$ for TP3 and a second subgroup $105_4$ for TP4. In FIG. 2, based on the CQI feedback, scheduler 106 has scheduled Hyper UE $104_1$ to be served by TP3 and TP4. Within Hyper UE $104_1$, the first subgroup $105_3$ served by TP3 includes CUE1 and CUE2 and the second subgroup $105_4$ served by TP4 includes CUE1 and CUE3. It is noted that in this example CUE1 is included in both subgroups $105_3$ and $105_4$. It is also noted that TUE1's CUEs, i.e. CUE1, CUE2, CUE3, could also be served by the network as TUEs on licensed orthogonal or semi-orthogonal resources.

Once the Hyper UE $104_1$ is formed and the best CUEs per potential serving TP have been selected, network controller 106 polls, via TPs TP1, TP2, TP3 and/or TP4, those best CUEs to provide probing feedback indicating their probing beacon received signal strength measurements along with the corresponding TUE IDs. In some embodiments, the CUEs only provide probing feedback for received signal strength measurements that are above a threshold value. In some embodiments, the best CUEs transmit the probing feedback in an uplink transmission in the licensed spectrum band.

In some embodiments, the network controller 106 selects a channel in the unlicensed spectrum for the hyper UE $104_1$ to use for intra-group D2D sidelink transmissions. For example, in some embodiments, network controller 106 determines the sidelink-to-sidelink (SL2SL) interference cost of assigning a given Hyper UE, such as Hyper UE $104_1$, each of the available unlicensed channels and stores the associated cost. The SL2SL interference cost is determined based on the probing feedback provided by TUEs. For example, in some embodiments, the cost of assigning a Hyper UE a given unlicensed channel is the sum of the maximum long-term SL2SL interference that would be observed by each of the other TUE(s) operating on the channel, including the TUE being examined, assuming channel reciprocity of the probing measurements.

Figure 3:
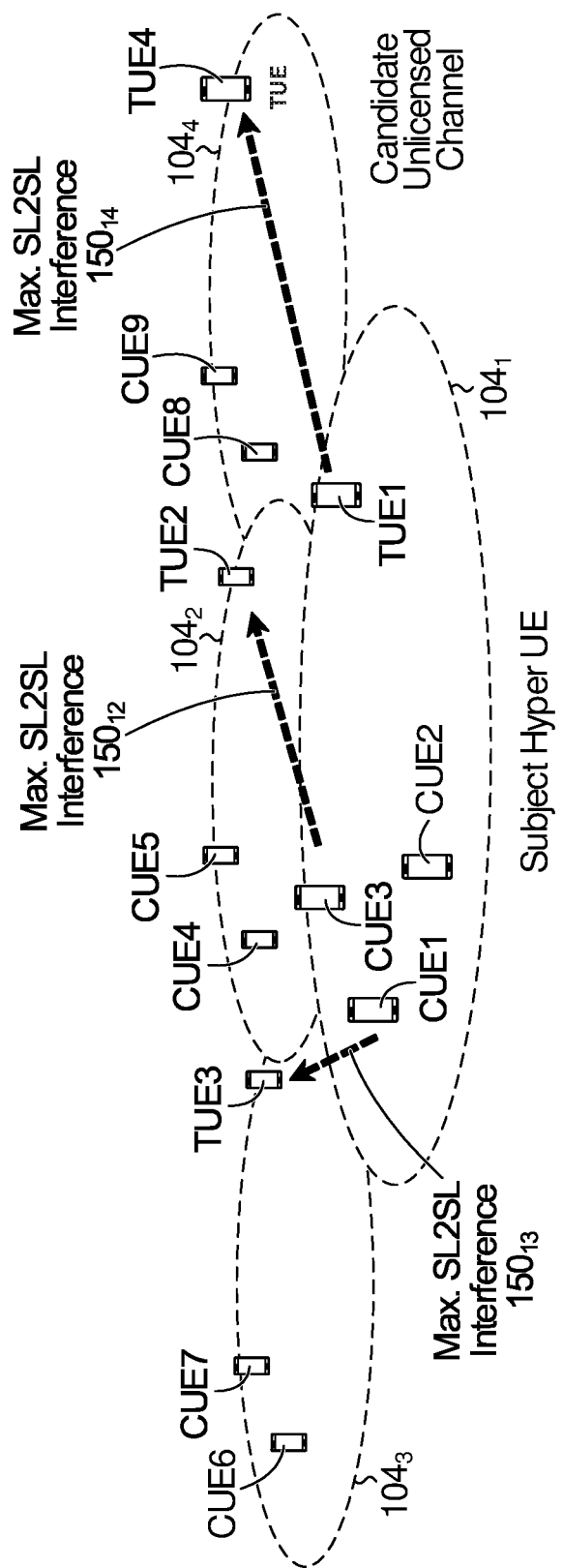
FIG. 3 is a block diagram of a network containing multiple cooperating UE groups in accordance with an embodiment of the present disclosure.

FIG. 3 depicts an example of how assigning Hyper UE $104_1$ a given candidate unlicensed channel can have a SL2SL interference cost for the respective TUEs TUE2, TUE3, TUE4 for three other Hyper UEs $104_2$, $104_3$, $104_4$ operating on the candidate unlicensed channel. Hyper UEs $104_1$ and $104_2$ shown in FIG. 3 correspond to Hyper UEs $104_1$ and $104_2$ shown in FIG. 2. Hyper UE $104_3$ includes TUE3 and CUEs CUE6 and CUE7. Hyper UE $104_4$ includes TUE3 and CUEs CUE8 and CUE9. For a given Hyper UE, the maximum SL2SL interference experienced by the TUE of another Hyper UE is the maximum SL2SL interference caused by any cooperating UE that is transmitting D2D sidelink transmissions in the unlicensed spectrum as part of the Hyper UE. For example, this includes CUE(s) that are configured to relay traffic to the Hyper UE's TUE. This may also include the Hyper UE's TUE if the TUE also transmits in the unlicensed spectrum. For example, as discussed in further detail later on, in some embodiments a TUE multi-casts a response message in the unlicensed spectrum to indicate an end to sidelink transmission to the TUE and/or multi-casts closed loop power control (CLPC) information for one or more of the Hyper UE's CUEs over the unlicensed spectrum.

In the example depicted in FIG. 3, based on the probing feedback information, the network controller 106 determines that the maximum SL2SL interference $150_{13}$ that would be experienced by TUE3 by assigning Hyper UE $104_1$ the candidate unlicensed channel would result from D2D sidelink transmissions by CUE1 on the candidate unlicensed channel, whereas the maximum SL2SL interferences $150_{12}$ and $150_{14}$ that would be experienced by TUE2 and TUE4 would result from D2D sidelink transmissions by CUE3 and TUE1, respectively, on the candidate unlicensed channel. Therefore, in some embodiments, the network controller 106 determines the total SL2SL interference cost associated with assigning the candidate unlicensed channel to CUE1 as the sum of the maximum SL2SL interferences $150_{12}$, $150_{13}$ and $150_{14}$.

In some embodiments, the network controller 106 then assigns an unlicensed channel to Hyper UE $104_1$ based at least in part on the SL2SL interference costs associated with the available unlicensed channels. For example, this may involve excluding an unlicensed channel from consideration as a candidate unlicensed channel for assignment to a Hyper UE if the sum of the maximum SL2SL interference any TUE would receive from all Hyper UEs is greater than a threshold. The threshold is implementation specific. For example, the threshold may be set by a network operator based on prototypes and field trials.

In some embodiments, the network controller 106 sorts the remaining examined unlicensed channels in ascending order of the total estimated SL2SL interference cost. Starting from the first unlicensed channel on the sorted list, the network controller 106 determines if any existing Hyper UEs operating on the unlicensed channel, e.g. Hyper UEs $104_2$, $104_3$, $104_4$, have the same frame period for unlicensed channel access as the instant Hyper UE $104_1$. If so, the network controller 106 synchronizes the frame period of Hyper UE $104_1$ with that of the Hyper UE receiving the least maximum SL2SL interference in the set of Hyper UEs having the same frame period as Hyper UE $104_4$. The network controller 106 synchronizes the frame period of Hyper UE $104_1$ with the frame period of one of the other Hyper UEs by aligning a reference point $t_0$ at which the Hyper UE $104_1$ starts cycles of its frame period to the earliest FBE frame start of the other Hyper UE. This can be done by transmitting information indicating the channel assignment and the reference point $t_0$ as part of a common-parameters configuration (CPC) message for Hyper UE $104_1$, as discussed in further detail later on.

If no other existing Hyper UE operating on the unlicensed channel shares the same frame period as Hyper UE $104_1$, then the channel is skipped and the next unlicensed channel on the list is considered.

In some embodiment, if none of the candidate unlicensed channels on the sorted list has an existing Hyper UE with the same frame period as Hyper UE $104_1$ operating on the channel, then network controller 106 assigns the first unlicensed channel on the list to Hyper UE $104_1$.

Referring again to FIG. 2, in order to synchronize an LBT procedure among the CUEs in Hyper UE $104_1$, network controller 106 generates a Hyper UE-specific CPC message that includes information to be used by CUEs in Hyper UE $104_4$, i.e., CUE1, CUE2, CUE3, for synchronous CCA as FBE in the unlicensed spectrum. As depicted in FIG. 2, scheduler 106 has scheduled CUEs of Hyper UE $104_1$ to be served by TP3 and TP4. As such, network controller 106 transmits the CPC message for Hyper UE $104_1$ to TP3 and TP4 over backhaul connections $108_3$ and $108_4$ for transmission by TP3 and TP4 to CUE1, CUE2, and CUE3 over the licensed spectrum. For example, the CPC message for Hyper UE $104_1$ can be transmitted by TP3 to CUE2 over licensed access link $110_{32}$, can be transmitted by TP4 to CUE3 over licensed access link $110_{43}$, and can be transmitted by TP3 and/or TP4 to CUE1 over licensed access link $110_{31}$ and/or $110_{41}$. In some embodiments, the CPC message is transmitted within a downlink (DL) control signal over the licensed access links.

The Hyper UE-specific CPC message can be transmitted in a periodic or aperiodic semi-static manner. In some embodiments, the CPC message is assigned a message identifier (ID).

In some embodiments, traffic flows to be relayed to TUE1 may be classified according to Quality of Service (QoS) priority class indices. For example, a first traffic flow having a higher priority than a second traffic flow may be classified with a higher priority class index. In some embodiments, the Hyper UE-specific CPC message for Hyper UE $104_1$ further includes information indicating a priority class index associated with a traffic flow to be relayed to TUE1.

In some embodiments, multiple unlicensed channel access priority classes are defined and each unlicensed channel access priority class is associated with a priority class index-specific set of parameters for UEs to use when accessing the unlicensed spectrum as FBE. In such embodiments, CUEs may use the priority class index associated with a traffic flow to look up the priority class index-specific set of parameters to use as part of accessing the unlicensed spectrum for relaying the traffic flow to a TUE. In some cases, a default priority class index may be defined, and the default priority class index is assumed if the CPC message does not include information indicating the priority class index. In other embodiment, the CPC message includes information indicating the priority class index-specific set of channel access parameters corresponding to the priority class index associated with traffic to be relayed to the TUE, so that the UE does not have to look them up based on the priority class index.

In some embodiments, the priority class index-specific set of channel access parameters includes a maximum sidelink burst length parameter and a minimum frame period parameter. In some embodiments, the maximum sidelink burst length parameter and the minimum frame period parameter are each defined as an integer multiple of a transmission time unit (TTU), e.g. a subframe duration, a slot duration or a symbol duration, associated with communications in the licensed spectrum band.

In some embodiments, the CPC message further includes information indicating a reference time point, $t_0$, to start cycles of the frame period to access a channel in the unlicensed spectrum as FBE.

In some embodiments, the group-specific CPC message includes information indicating the unlicensed channel that has been assigned to the Hyper UE.

In some embodiments, the CPC message further includes information indicating a maximum number of device-to-device (D2D) sidelink (SL) retransmissions, $N_{SL\text{-}reTx}$, that are permitted in the unlicensed spectrum.

Each of the UEs that is acting as a CUE for TUE1 in Hyper UE $104_1$, i.e., CUE1, CUE2, CUE3, receives the CPC message from its respective TP(s) over the licensed spectrum, attempts to access the unlicensed spectrum as FBE in accordance with a priority class index-specific set of channel access parameters in accordance with the information provided in the CPC message, including performing a synchronous CCA with the other CUEs in Hyper UE $104_1$ to contend for a transmission opportunity on the unlicensed channel that has been assigned to Hyper UE $104_1$. Examples of FBE-compliant unlicensed spectrum access procedures in accordance with embodiments of the present disclosure are discussed later with reference to FIGS. 4 to 9.

In some embodiments, CUEs employ an energy-detection (ED) based CCA in which a channel is determined to be busy if the total energy detected in the channel is greater than a CCA threshold value. In some embodiments, the CCA threshold value for a given UE is upper bounded by a function of the transmit power of the UE. For example, in some regions, the upper bound of the CCA threshold has been regulated as follows:

$$CCA\ Threshold \geq -73\frac{dBm}{MHz} + (23 - \max Tx\ EIRP)\ [dBm],$$

where max Tx EIRP is a UE's maximum transmit equivalent isotropically radiated power (EIRP). As a result, the higher the max Tx power and/or the antenna gain, the lower the CCA threshold that is allowed. As such, an unlicensed spectrum access opportunity may depend on the result of the transmit power control mechanism that is used for sidelink transmission.

If the CCA performed by a CUE that has traffic data to forward to a TUE indicates an unlicensed spectrum resource is idle/clear, the CUE transmits a SL burst to the TUE in the unlicensed spectrum resource. As depicted in FIG. 2, CUE1, CUE2 and CUE3 transmit SL bursts to TUE1 over unlicensed sidelinks $114_{11}$, $114_{21}$ and $114_{31}$, respectively. Forwarded traffic data originating from different sources can be either augmented in the payload or multiplexed in the frequency or time domains. For example, CUE1 is included in both subgroups $105_3$ and $105_4$, which means that CUE1 potentially forwards traffic data intended for TUE1 from both TP3 and TP4.

The individual UEs forming a Hyper UE may use a first air interface designed for an access link (uplink/downlink) to communicate with the network TPs over the first licensed spectrum band, and use a second air interface designed for D2D sidelink communications over a second unlicensed spectrum band. The access link and sidelink air interfaces may use the same radio access technology (RAT) such as LTE or future generation, e.g., 5 G, new radio (NR) or they may use distinct RATs e.g. the access link air interface may belong to 5 G NR and the sidelink air interface may belong to LTE and vice versa. In another embodiment, the access link air interface may belong to LTE or 5 G NR and the second air interface may belong to WiFi. In another embodiment, the access link and sidelink air interfaces have designs that are similar, harmonized and/or unified. Specifically, in some embodiments the UE is configured with an air interface that handles uplink, downlink and sidelink communications using licensed and unlicensed spectrum in a unified way. In some embodiments, the same RAT is employed for both network and sidelink communications, in licensed and unlicensed bands respectively. In some embodiments, this involves using different air interfaces of the same RAT for network/licensed and sidelink communications. In some cases, the transmit or receive chain is RAT specific and can accommodate different air interfaces for the sidelink and network link.

In some embodiments, a TUE transmits a response message over an unlicensed channel to indicate the end of sidelink transmission to the TUE for a given frame period. In some embodiments, the group-specific CPC message includes information indicating the length of the response message that the TUE is configured to transmit over the second spectrum band to indicate an end to sidelink transmission to the TUE. In some cases, the length of the response message is defined as an integer multiple of a symbol duration associated with communications in the licensed spectrum band.

For example, in response to detecting an end of the last of the sidelink transmissions $114_{11}$, $114_{21}$, $114_{31}$ from CUE1, CUE2, CUE3, TUE1 multi-casts a sidelink end (SL-End) message $116_1$ to its CUEs, i.e., CUE1, CUE2 and CUE3, over the unlicensed spectrum. The multi-cast SL-End message $116_1$ is transmitted by TUE1 as a response frame to indicate that sidelink transmission to TUE1 has ended for a given transmission opportunity/frame period. In some embodiments, the SL-End message $116_1$ is transmitted after a SIFS. The SIFS accounts for time that may be needed for the wireless air interface of the TUE to transition between receiving and transmitting and/or for the wireless air interface of serving CUE(s) to transition between transmitting and receiving. ACK/NACK information for the HARQ process 124 for a given transmission will only be available after TUE1's decoding delay. In general, this means that the ACK/NACK information for a given transmission is not available until after a maximum channel occupancy (MCO) in the unlicensed spectrum for the transmission has expired, and thus transmitting such ACK/NACK information will require an LBT process by TUE1.

In some embodiments, the SL-End message is encoded so that it can only be decoded by the intended in-group CUEs.

In some embodiments, the SL-End message is transmitted using the most reliable modulation and coding scheme (MCS) level independent of sidelink channel quality. This is done in an effort to maximize the probability that the SL-End message will be successfully received/decoded by in-group CUEs.

In some embodiment, the SL-End message includes symbols transmitted at a reference power level to allow for sidelink measurements/sounding at CUEs. This can eliminate or at least reduce the need for regular transmission of sidelink CQI feedback from the TUE to each CUE. This may also allow for more accurate/frequent estimation of sidelink pathloss for sidelink Open Loop Power Control (SL-OLPC).

To enable SL Closed Loop Power Control (SL-CLPC), a multi-cast SL-CLPC message can be multi-cast by the TUE following the SL-End message. In some embodiments, the SL-CLPC message may be appended to SL-End message so that it directly follows the SL-End message. In other embodiments, there is some time, $T_{gap}$, between the end of the multi-cast SL-End message and the beginning of the multi-cast SL-CLPC message, where $T_{gap} \leq SIFS$. The SL-CLPC message may be transmitted using the most reliable MCS level independent of the sidelink channel quality. The SL-CLPC message may include dynamic PC commands from the TUE for each CUE. For example, in some embodiments, the SL-CLPC message includes, for each CUE, a dynamic CLPC command indicating a signed power offset to be applied to the transmit power of the CUE. Each dynamic CLPC command may be a code of at least two bits. Leveraging the proximity of cooperating UEs, unlike LTE's UL PC, more quantization levels may be dedicated to power decrement commands than power increment commands.

Table 1 below is an example of a two-bit CLPC command codebook with more power decrement commands than power increment commands that may be used in some embodiments.

| | CLPC Command Code | | | |
|---|---|---|---|---|
| | 10 | 00 | 01 | 11 |
| Signed Power Offset | −1 dB | 0 dB | +1 dB | −3 dB |

With reference to FIG. 2, the table below is an example of a format for a SL-CLPC message that may be transmitted by TUE1 in accordance with the CLPC command codes shown in the above table.

| | CUE ID | | | |
|---|---|---|---|---|
| | CUE1 | CUE2 | CUE3 | ... |
| CLPC Command Code | 01 | 11 | 00 | ... |

As noted above, in some cases the CCA threshold value for a given UE is upper bounded by a function of the transmit power of the UE. In such cases, CLPC can be viewed as a trade-off between a sidelink's signal to noise ratio (SNR) and medium access probability. In other words, CLPC can affect a UE's medium access opportunity. For instance, if a TUE receives at least one in-group SL transmission for a given HARQ process ID, the TUE may send a −3 dB PC command (e.g. CLPC command "11") to the remaining CUEs assisting with HARQ process ID, causing those CUEs to reduce their transmit power by −3 dB. If the CUEs' CCA thresholds are upper bounded by their transmit powers, then reducing their transmit powers by −3 dB increases their CCA thresholds, and therefore increases their medium access probability for the next CCA.

In some embodiments, the unlicensed spectrum used for D2D sidelink transmissions may overlap with the spectrum in which other communications systems/networks operate. For example, with reference to FIG. 2, the unlicensed channel in which the sidelink transmissions $114_{11}$, $114_{21}$, $114_{31}$ are transmitted may overlap with the unlicensed 5 GHz spectrum in which WiFi/WLANs operate. For example, the sidelink transmissions $114_{11}$, $114_{21}$, $114_{31}$ may be transmitted within the same unlicensed 20 MHz channel within which the STAs and APs of a WLAN 130 communicate. In some embodiments, the sidelink transmissions $114_{11}$, $114_{21}$, $114_{31}$ may be transmitted within a 20 MHz channel organized into wo resource blocks (RBs) each having a bandwidth of 180 kHz (generally indicated at 134 in FIG. 2), which may overlap with a 20 MHz channel organized into 52 subcarriers each having a bandwidth of 312.5 kHz (generally indicated at 132 in FIG. 2) within which the STAs and APs of a WLAN 130 communicate. Further examples of sidelink transmission formats and constraints are described later in the present disclosure.

A TUE may be within network coverage or outside coverage. In FIG. 2, TUE1 is shown as being within coverage of Hyper Cell 102. In particular, TUE1 is shown having licensed access links $112_{31}$ and $112_{41}$ with TPs TP3 and TP4, respectively. Depending on whether a TUE is within network coverage, the TUE may combine the information received from TPs over the licensed spectrum and/or from CUEs over the unlicensed spectrum, in order to decode transmissions intended for the TUE. For the in-coverage scenario, all signaling between the TP(s) and the TUE may be conveyed through the licensed access link(s) between the TP(s) and the TUE, whereas for the out-of-coverage case such signaling is conveyed through the unlicensed sidelinks between the CUE(s) and the TUE. As such, in some embodiments, a TUE may employ a Hybrid Automatic Repeat reQuest (HARQ) process that merges the HARQ transport blocks received over the licensed and unlicensed links as HARQ revisions. For example, as depicted in FIG. 2, TUE1 employs a HARQ process 124 that merges licensed HARQ revisions 118 for transmissions received over licensed access links $112_{31}$ and $112_{41}$, with unlicensed HARQ revisions 120 and 122 for unlicensed sidelink transmissions received from the two subgroups $105_3$ and $105_4$.

The 3GPP Release 13 specification discussed earlier includes channel access priority classes for devices accessing a physical downlink shared channel (PDSCH). In some embodiments of the present disclosure, the unlicensed channel access priority classes for accessing unlicensed spectrum as FBE are defined so that sidelink maximum channel occupancy times (MCOTs) associated with each class match those of the physical downlink shared channel (PDSCH) access priority classes set out in Table 15.1.1-1 of the 3GPP Release 13 specification. FIG. 4 depicts a Table 1 that includes an example of unlicensed channel access priority classes that are mapped to TUE QoS priority class indices in accordance with such embodiments.

In order to comply with the European FBE regulatory requirements discussed earlier, the following design rules were used to determine the priority class index-specific sets of parameters listed in Table 1:

SL MCOT=Max. Useful SL Burst+RFSD+SIFS+SL-End+CLPC [ms]

where:
if SL-End+CLPC Duration>0, then
RFSD+SIFS=1 Symbol Duration,
and
if SL-End+CLPC Duration=0, then
RFSD+SIFS=0, Min. FP=Ceil (1.05*SL MCOT/Alignment Unit Duration [ms]) [Alignment Units], and One-shot CCA duration=PIFS=25 μs, where SL MCOT is the maximum channel occupancy time for a medium access opportunity, Max. Useful SL Burst is the maximum sidelink burst length, RFSD is a reserved fractional symbol duration, SIFS is a short inter-frame space, SL-End+CLPC is the duration of a response message transmitted by a TUE, Alignment Unit Duration is the durations of an alignment unit, e.g. a subframe duration, a slot duration or a symbol duration, and Ceil( ) is the ceiling function.

In some embodiments, a QoS priority class is assigned to a TUE based on the delay tolerance of the TUE's traffic and/or the overall volume of traffic that is intended for the TUE. For example, because a CUE will be allowed to assess the unlicensed medium for sidelink transmission only every frame period, in some embodiments:

A higher QoS priority (lower priority class index) featuring a shorter Min. FP and SL MCOT may be assigned to accommodate TUE traffic that is less delay-tolerant so that medium access opportunities to relay traffic to the TUE occur more frequently; and A lower QoS Priority (higher index) featuring a longer Min. FP and SL MCOT may be assigned to accommodate a larger volume of traffic.

However, in the example depicted in Table 1, to maintain lower latency and higher medium access opportunities for QoS priority class 3 relative to QoS priority class 4, the Min. Idle Period percentage for Class 4 has been increased from 5% of SL MCOT to the smallest percentage that increases the Min. FP by one unit of the largest alignment granularity, which in this example is one subframe duration. In particular, in this case, the following equation is applied only for QoS priority class 4:

Min. $FP$=Ceil (1.40*$SL$ MCOT/Alignment Unit Duration [ms])[Alignment Units]

For illustrative purposes, in Table 1 it has been assumed that subframe, slot and symbol durations are equal to those used in Long Term Evolution (LTE) licensed communications, where one LTE subframe duration is 1 ms, one LTE slot duration is 0.5 ms and one LTE symbol duration is 1/7 of a slot duration or 71.429 μs. Unlicensed sidelink transmissions may be aligned to different alignment units in different embodiments. For example, the last three columns of Table 1 express the minimum frame period, Min. FP, in integer multiples of units of LTE subframes, slots and symbols, respectively, in accordance with the equations for Min. FP provided above.

Figure 5:
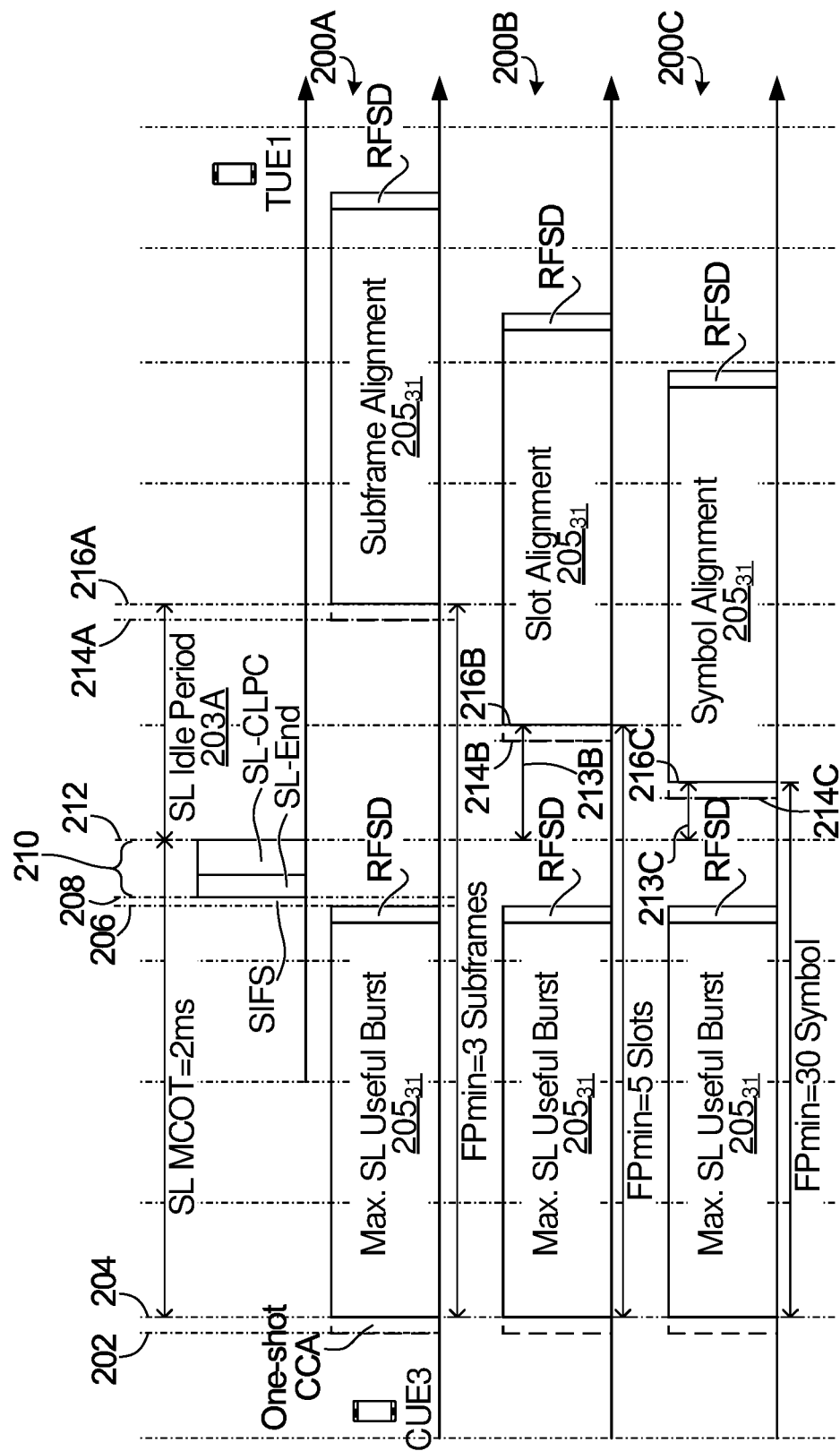
FIG. 5 is a timing diagram showing a first example of an unlicensed spectrum band access procedure by a CUE to access a channel in an unlicensed spectrum band as FBE using priority class index-specific channel access parameters in accordance with the table shown in FIG. 4.

FIG. 5 is a timing diagram showing an unlicensed spectrum band access procedure by a CUE to access a channel in an unlicensed spectrum band as FBE using priority class index-specific channel access parameters in accordance with the table shown in FIG. 4. In particular, FIG. 5 depicts three unlicensed spectrum access scenarios 200A, 200B, 200C by a CUE for three different sidelink burst alignments in accordance with the channel access parameters for the highest QoS priority class (priority class index 1) of Table 1, where SL MCOT=2 ms.

In the first scenario 200A (subframe alignment), the minimum frame period, FPmin, is equal to 3 subframes. In the second scenario 200B (slot alignment), FPmin is equal to 5 slots. In the third scenario 200C (symbol alignment), FPmin is equal to 30 symbols. In each scenario, the CUE initiates a one-shot CCA at 202 to determine if an unlicensed channel assigned to the CUE is available. In each scenario, the CUE finds the unlicensed channel to be available, and transmits a sidelink burst $205_{31}$ at 204. For illustrative purposes it is assumed that the sidelink burst $205_{31}$ is of the maximum sidelink burst length for QoS priority class 1, i.e. 24 symbols, and is appended by RFSD. In response to detecting an end to the sidelink burst $205_{31}$ at 206, the TUE multi-casts, after SIFS (16 μs), the SL-End+CLPC response message 210 over the assigned unlicensed channel at 208. The SL-End+CLPC response message 210 ends at 212, marking the end of channel occupancy and the start of the sidelink idle period before the next cycle of the frame period.

In the first scenario 200A, the sidelink idle period 213A starts at 212 and ends at 216A, which marks the start of the next cycle of the 3 subframe frame period. In the first scenario 200A, the CUE initiates another one-shot CCA at 214A, which is PIFS=25 μs (duration of the CCA) in advance of the start of the next cycle of the 3 subframe frame period.

In the second scenario 200B, the sidelink idle period 213B starts at 212 and ends at 216B, which marks the start of the next cycle of the 5 slot frame period. In the second scenario 200B, the CUE initiates another one-shot CCA at 214B PIFS=25 μs in advance of the start of the next cycle of the 5 slot frame period.

In the third scenario 200C, the sidelink idle period 213C starts at 212 and ends at 216C, which marks the start of the next cycle of the 30 symbol frame period. In the third scenario 200C, the CUE initiates another one-shot CCA at 214A PIFS=25 μs in advance of the start of the next cycle of the 30 symbol frame period.

In the example depicted in Table 1, a TUE transmits a response message SL-End+CLPC having a duration of 3 symbols. In other embodiments, the duration of the response message may be longer or shorter than 3 symbols. In some embodiments, a TUE does not transmit a response message.

FIG. 6 depicts three tables that include QoS priority class-specific channel access parameters for different SL-End+CLPC response message lengths. Table 2 includes QoS priority class-specific channel access parameters for an embodiment in which the SL-End+CLPC response message is two symbols long. Table 3 includes QoS priority class-specific channel access parameters for an embodiment in which the SL-End+CLPC response message is one symbol long. Table 4 includes QoS priority class-specific channel access parameters for an embodiment in which an SL-End+CLPC response message is not sent (o symbol duration) and the RFSD and SIFS are also zero duration, which means that the maximum sidelink burst length for each priority class is equal to the maximum channel occupancy time for each priority class in this embodiment.

It is noted that as the length of the SL-End+CLPC response message decreases, the maximum useful sidelink burst length increases, e.g., the SL-End+CLPC response message in the embodiment of Table 2 is 1 symbol duration shorter than that of the embodiment shown in Table 1, and the length of each Max. Useful Sidelink Burst listed in Table 2 is 1 symbol longer than that of the corresponding Max. Useful Sidelink Burst listed in Table 1.

Similar to Table 1, the examples shown in Tables 2 to 4 assume that the transmission time units, i.e. subframe duration, slot duration and symbol duration, are the same as those in LTE. One skilled in the art will appreciate that these particular durations were selected for illustrative purposes only, and that other durations may be used in other embodiments to match transmission time unit durations of other radio access technologies.

Figure 7:
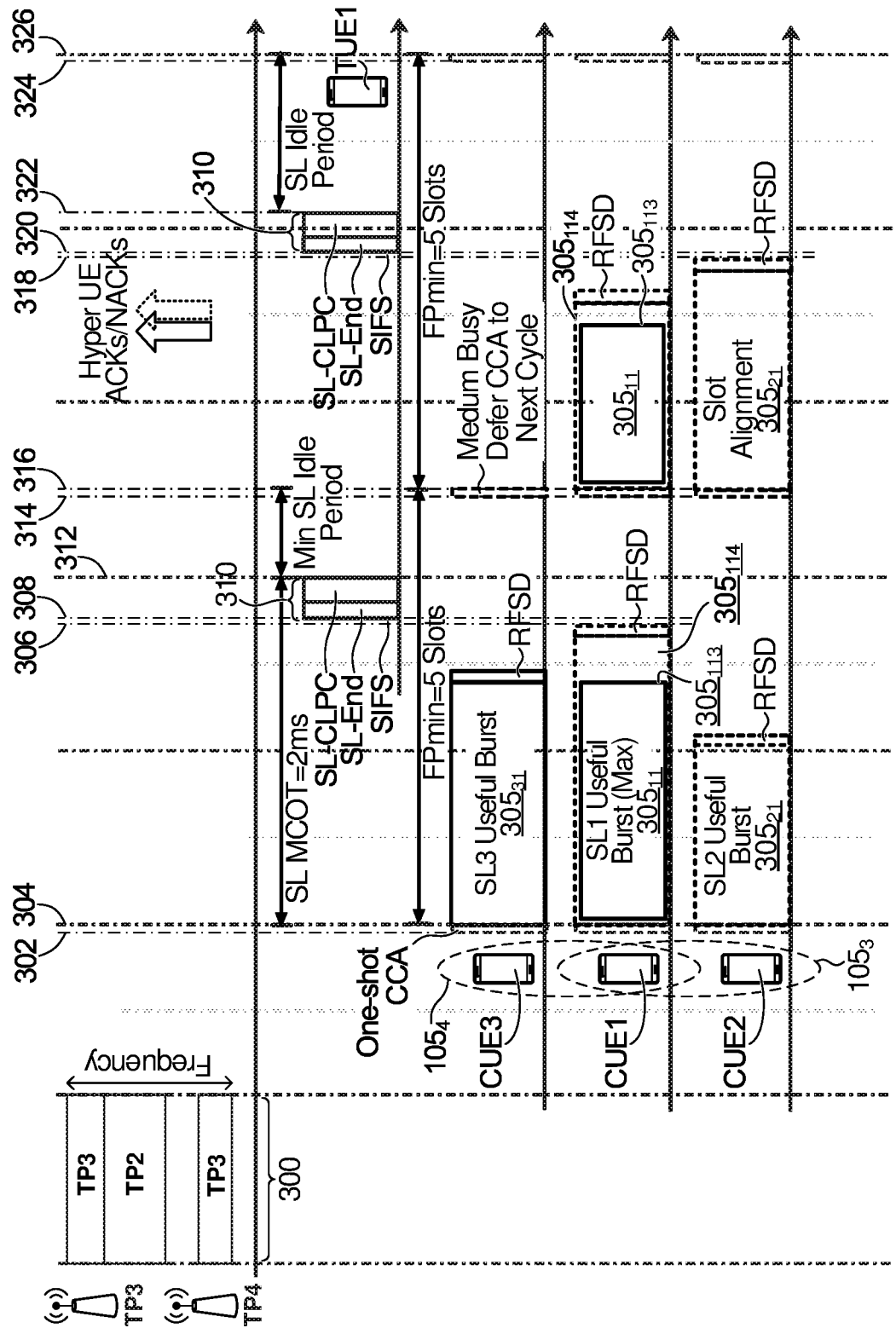
FIG. 7 is a timing diagram showing an example of coordinated UE cooperation in accordance with an embodiment of the present disclosure.

FIG. 7 is a timing diagram showing an example of coordinated UE cooperation in accordance with an embodiment of the present disclosure. In particular, FIG. 7 shows an example of operations performed by TP3, TP4, CUE1, CUE2, CUE3 and TUE1 from FIG. 2 for coordinated UE cooperation in the unlicensed spectrum within Hyper UE $104_1$ using priority class index-specific channel access parameters in accordance with Table 1 shown in FIG. 4. More specifically, FIG. 7 depicts a scenario where traffic intended for TUE1 has been assigned TUE QoS Priority Class 1 (SL MCOT=2 ms) and the minimum frame period, FPmin, has been selected so that sidelink burst are aligned to licensed band slots (slot duration=0.5 ms).

As discussed above with reference to FIG. 2, the CUEs of Hyper UE $104_1$ include first and second subgroups of CUEs $105_3$ and $105_4$ served by TP3 and TP4, respectively. Subgroup $105_3$ includes CUE1 and CUE2. Subgroup $105_4$ includes CUE1 and CUE3. As depicted in FIG. 7, transmissions 300 from TP3 and TP4 over the licensed spectrum may be multiplexed in the frequency-domain. More generally, transmissions over the licensed spectrum may be multiplexed in one or more of the time-domain, the frequency-domain, or the code-domain, to name a few non-limiting examples.

As described above with reference to FIG. 2, each of the CUEs will have received a CPC message from its respective TP(s), the CPC message including information to be used by the CUEs to access the unlicensed spectrum as FBE. As described above, this information may include:

- the QoS priority class index of the TUE's traffic to be relayed or the corresponding Max. SL Burst and Min. FP if UEs do not store priority-class specific access parameter lookup table,
- the reference time point, to, at which the consecutive cycles of the frame period start,
- the number of symbols constituting the SL-End-n-CLPC response message, and
- the selected unlicensed channel assigned to Hyper UE $104_1$.

The transmission of the CPC message to the CUEs has not been shown in FIG. 7 in order to simplify the Figure.

For initial sidelink access, upon successful decoding at least one transport block (TB) intended for TUE1 (each TB having been transmitted by a respective TP over the licensed spectrum), each of CUE1, CUE2 and CUE3 uses the information that was previously received from the network in a Hyper UE-specific CPC message to attempt to forward the received TB(s) at the earliest FBE frame starting point. As such, at 302 CUE1, CUE2 and CUE3 all start a synchronous one-shot CCA at PIFS (25 μs) before the periodic frame start at 304.

No blank blocking signals or defer periods are required before sidelink transmission, which means that CUEs of the same Hyper UE will not affect each other's CCA.

If the synchronous CCA performed by a CUE indicates an unlicensed spectrum resource is idle/clear, the CUE transmits a SL burst to the TUE in the unlicensed spectrum resource. For example, as depicted in FIG. 7, the synchronous CCA started by each of CUE1, CUE2 and CUE3 at 302 concludes that the unlicensed spectrum channel is idle, and thus CUE1, CUE2 and CUE3 transmit sidelink bursts SL1 $305_{11}$, SL2 $305_{21}$ and SL3 $305_{31}$, respectively starting at 304. CUE2 is included in the first subgroup $105_3$ and is served by TP3, thus the sidelink burst SL2 $305_{21}$ transmitted by CUE2 includes traffic data intended for TUE1 that was received over the licensed spectrum from TP3. Similarly, CUE3 is included in the second subgroup $105_4$ and is served by TP4, thus the sidelink burst SL3 $305_{31}$ transmitted by CUE2 includes traffic data intended for TUE1 that was received over the licensed spectrum from TP4. CUE1 is included in both subgroups $105_3$ and $105_4$, which means that CUE1 potentially forwards traffic data intended for TUE1 from both TP3 and TP4. For example, as depicted in FIG. 7, the sidelink burst SL1 $305_1$ transmitted by CUE1 includes first traffic data $305_{113}$ intended for TUE1 that was received over the licensed spectrum from TP3 and second traffic data $305_{114}$ intended for TUE1 that was received over the licensed spectrum from TP4.

In response to detecting, at 306, an end of the last of the sidelink bursts SL1, SL2, SL3, at 308 TUE1 multi-casts the SL-End message 310 over the unlicensed channel after a SIFS as a response frame to indicate that sidelink transmission to TUE1 has ended for the current transmission opportunity/frame period. As depicted in FIG. 7, the sidelink burst SL1 $305_{11}$ transmitted by CUE1 ends last. As a result, the TUE's transmission of the SL-End message 310 starts after a SIFS following the RFSD at the end of the sidelink burst SL1 $305_{11}$.

As discussed above, in some embodiments, the SL-End message 310 includes an SL-End message portion and an SL-CLPC message portion appended to the SL-End message portion. For example, the SL-End message portion may include symbols transmitted at a reference power level to allow for sidelink measurements/sounding at CUEs, and the SL-CLPC message portion may include a CLPC command for each CUE.

If the CPC message indicated that the length of the SL-End message is >0, then after transmitting the SL burst and the RFSD, each CUE waits to detect the multi-cast SL-End message 310 starting at any of the immediately following symbols and before the CCA of the new cycle starts.

Hyper UE ACKs/NACKs for the current transmissions to TUE1 may be transmitted after TUE1's decoding delay.

The SL-End message 310 for the first frame period ends at 312, which marks the end of channel occupancy. In this first cycle, the sidelink burst SL1 $305_{11}$ transmitted by CUE1 has the maximum useful burst length for priority class 1 (24 symbols) according to Table 1, which means that the end of the SL-End Message 310 at 312 occurs at the maximum channel occupancy time for priority class 1 (2 ms) and the idle period that begins at 312 and ends at the start of the next frame period cycle at 316 is the minimum idle period for priority class 1 with slot-level alignment.

At 314 CUE1, CUE2 and CUE3 all start another synchronous one-shot CCA at PIFS before the next periodic frame start at 316. CUE1 and CUE2 complete their CCA process and conclude that the unlicensed spectrum channel is idle. As a result, CUE1 and CUE2 transmit their sidelink bursts SL1 $305_{11}$ and SL2 $305_{21}$, respectively, at 316. However, CUE3 finds that the unlicensed spectrum channel is busy/occupied and defers its CCA to 324 to begin PIFS in advance of the start of the next cycle of the frame period.

In this second cycle of the frame period, the sidelink burst SL1 $305_{11}$ transmitted by CUE1 again ends last at 318, so the SL-End Message 310 is transmitted by TUE1 starting at 320 (SIFS after then end of SL1 $305_{11}$) and ending at 322. However, in this second cycle the length of the sidelink burst $305_{11}$ is less than the maximum useful sidelink burst length for priority class 1, which means that the sidelink idle period between the end of the SL-End message 310 at 322 and the start of the next cycle of the frame period at 326 is greater than the minimum idle period for priority class 1 with slot-level alignment.

In the embodiments depicted in FIGS. 4 to 7, the unlicensed channel access priority classes for accessing unlicensed spectrum as FBE were defined so that sidelink MCOTs associated with each class match those of the physical downlink shared channel (PDSCH) access priority classes set out in Table 15.1.1-1 of the 3GPP Release 13 specification. In other embodiments, the classes are defined by specifying the Maximum useful sidelink burst length instead of the sidelink MCOT. The same design rules described above can be applied to comply with the European FBE regulatory requirements discussed earlier. FIG. 8 depicts a Table 5 that includes an example of unlicensed channel access priority classes that are mapped to TUE QoS priority class indices in accordance with such embodiments. In particular, FIG. 8 depicts channel access parameters assuming default LTE time units (i.e., subframe duration=1 ms, slot duration=0.5 ms and symbol duration=1/7 of a slot duration) and SL-End+CLPC=3 symbols.

Figure 9:
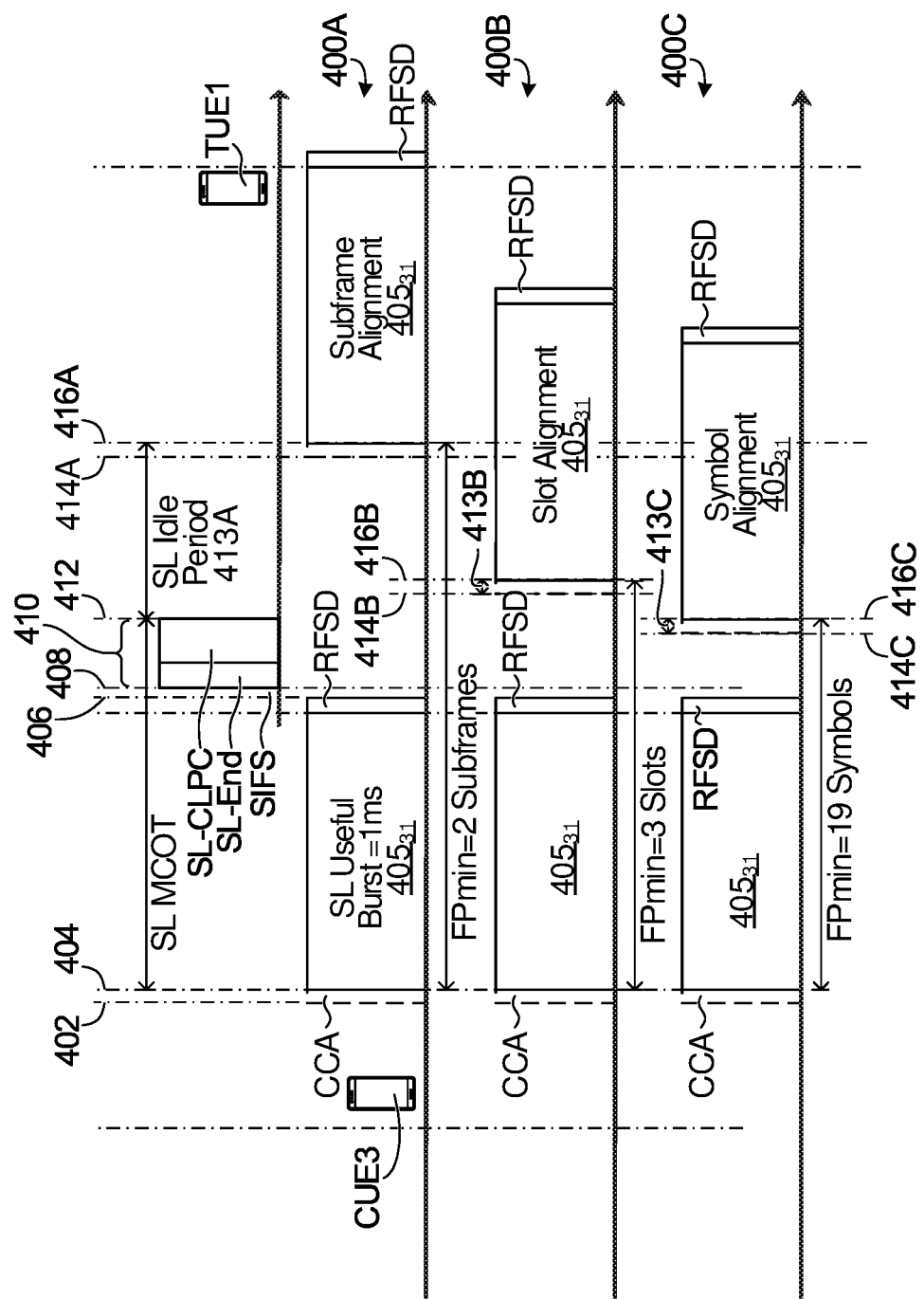
FIG. 9 is a timing diagram showing a second example of an unlicensed spectrum band access procedure by a CUE to access a channel in an unlicensed spectrum band as FBE using priority class index-specific channel access parameters in accordance with the table shown in FIG. 8.

FIG. 9 is a timing diagram showing an unlicensed spectrum band access procedure by a CUE to access a channel in an unlicensed spectrum band as FBE using priority class index-specific channel access parameters in accordance with the table 5 shown in FIG. 8. In particular, FIG. 9 depicts three unlicensed spectrum access scenarios 400A, 400B, 400C by a CUE for three different sidelink burst alignments in accordance with the channel access parameters for the highest QoS priority class (priority class index 1) of Table 5, where Maximum Useful SL Burst=1 ms or 14 symbols.

In the first scenario 400A (subframe alignment), the minimum frame period, FPmin, is equal to 2 subframes. In the second scenario 400B (slot alignment), FPmin is equal to 3 slots. In the third scenario 400C (symbol alignment), FPmin is equal to 19 symbols. In each scenario, the CUE initiates a one-shot CCA at 402 to determine if an unlicensed channel assigned to the CUE is available. In each scenario, the CUE finds the unlicensed channel to be available, and transmits a sidelink burst $405_{31}$ at 404. For illustrative purposes it is assumed that the sidelink burst $405_{31}$ is of the maximum sidelink burst length for QoS priority class 1, i.e. 14 symbols, and is appended by RFSD. In response to detecting an end to the sidelink burst $405_{31}$ at 406, the TUE multi-casts, after SIFS (16 µs), the SL-End+CLPC response message 410 over the assigned unlicensed channel at 408. The SL-End+CLPC response message 410 ends at 412, marking the end of channel occupancy and the start of the sidelink idle period before the next cycle of the frame period.

In the first scenario 400A, the sidelink idle period 413A starts at 412 and ends at 416A, which marks the start of the next cycle of the 2 subframe frame period. In the first scenario 400A, the CUE initiates another one-shot CCA at 414A, which is PIFS=25 µs (duration of the CCA) in advance of the start of the next cycle of the 2 subframe frame period.

In the second scenario 400B, the sidelink idle period 413B starts at 412 and ends at 416B, which marks the start of the next cycle of the 3 slot frame period. In the second scenario 400B, the CUE initiates another one-shot CCA at 414B, which is PIFS=25 µs in advance of the start of the next cycle of the 3 slot frame period.

In the third scenario 400C, the sidelink idle period 413C starts at 412 and ends at 416C, which marks the start of the next cycle of the 19 symbol frame period. In the third scenario 400C, the CUE initiates another one-shot CCA at 414A, which is PIFS=25 µs in advance of the start of the next cycle of the 19 symbol frame period.

In the example depicted in Table 5, a TUE transmits a response message SL-End+CLPC having a duration of 3 symbols. In other embodiments, the duration of the response message may be longer or shorter than 3 symbols. In some embodiments, a TUE does not transmit a response message.

Figure 10:
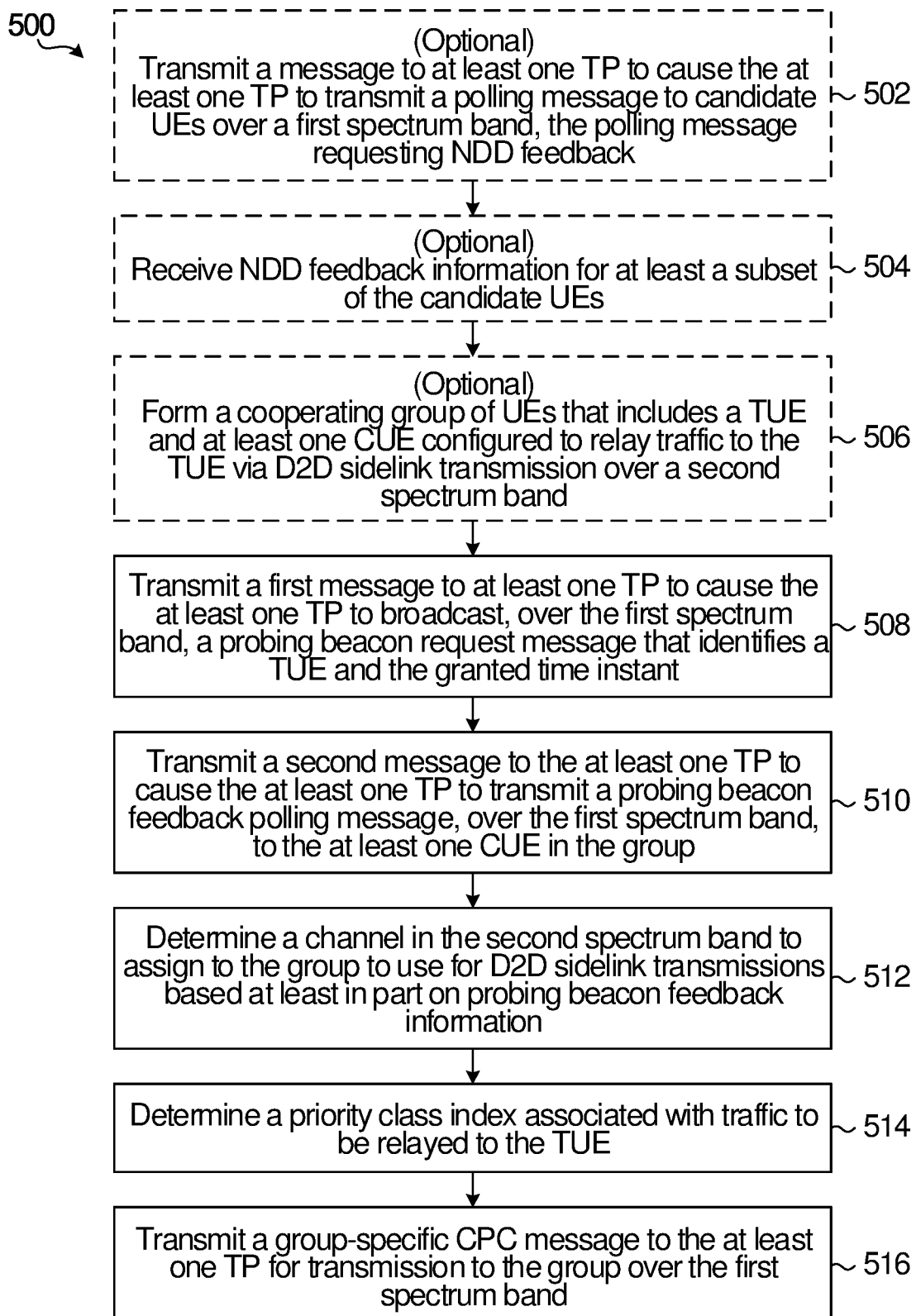
FIG. 10 is a flow diagram of examples operations in a network controller in accordance with an embodiment of the present disclosure.

FIG. 10 illustrates a flow diagram of example operations 500 in a network controller according to example embodiments described herein. Operations 500 may be indicative of operations occurring in a network node such as an eNB or the like.

In block 502, the network controller transmits a message to at least one TP to cause the at least one TP to transmit a polling message to candidate UEs over a first spectrum band, the polling message requesting NDD feedback. This may involve, for example, transmitting the polling message to the TP(s) over respective backhaul connection(s) for transmission by the TP(s) to candidate UEs over a first licensed spectrum band.

In block 504, the network controller receives NDD feedback information for at least a subset of the candidate UEs. This may involve, for example, receiving the NDD feedback information from TP(s) over backhaul connection(s).

In block 504, the network controller forms a cooperating group of UEs that includes the TUE and at least one CUE configured to relay traffic to the TUE via D2D sidelink transmission over a second spectrum band. This may involve, for example, forming the group based at least in part on the NDD feedback of the candidate CUEs. For example, in some embodiments, the network controller forms the cooperating group by including CUEs with similar NDDs. In some embodiments, the network controller forms a cooperating group of UEs by associating a group of candidate UEs with a group-specific ID.

In block 508, the network controller transmits a first message to at least one TP to cause the at least one TP to broadcast, over a first spectrum band, a probing beacon request message that identifies a TUE and a granted time instant. The probing beacon request message acts as an instruction to the TUE to broadcast a probing beacon on a channel in the second spectrum band at the granted time instant and acts as an instruction to all other candidate cooperating UEs to measure and store a received signal strength of the probing beacon transmitted by the TUE. In some embodiments, the channel in the second spectrum band on which the TUE is instructed to transmit the probing beacon is a dedicated probing channel not otherwise used for communications to or from the UEs. In some embodiments, the first spectrum band is a licensed spectrum band and the second spectrum band is an unlicensed spectrum band.

In block 510, the network controller transmits a second message to at least one TP to cause the at least one TP to transmit a probing beacon feedback polling message, over the first spectrum band, to the at least one CUE in the cooperating group of UEs. The probing beacon feedback polling message instructs the at least one CUE to provide probing feedback information indicating received signal strengths of probing beacons transmitted by TUEs, including the TUE of the instant cooperating group of UEs, and corresponding TUE IDs.

In block 512, the network controller determines a channel in the second spectrum band to assign to the cooperating group of UEs to use for D2D sidelink transmissions based at least in part on probing beacon feedback information. This may involve, for example, determining, for each of a plurality of candidate channels in the second spectrum band, a sidelink-to-sidelink (SL2SL) interference cost associated with assigning the channel to the cooperating group of UEs, and assigning a channel in the second spectrum band to the group based at least in part on those costs.

In some embodiments, the SL2SL interference cost associated with assigning a channel to the cooperating group of UEs is a sum of a maximum long-term sidelink-to-sidelink interference that would be observed by the TUE of the cooperating group of UEs and maximum long-term sidelink-to-sidelink interferences that would be observed by TUEs of any other groups of cooperating UEs operating on that same channel. In some embodiment, a candidate channel is excluded from consideration for assignment to the cooperating group of UEs if the sum of the maximum SL2SL interferences any TUE would receive is greater than a threshold value.

In some embodiments, the network controller sorts the plurality of candidate channels in an ordered list according to their associated sidelink-to-sidelink interference costs and, starting from a first candidate channel on the sorted list, determines if the candidate channel has been assigned to at least one other cooperating group of UEs with the same minimum FBE frame period as the instant cooperating group of UEs. If so, the network controller identifies the cooperating group of UEs among the at least one other cooperating group of UEs with the same minimum FBE frame period that would receive the least maximum SL2SL interference if the candidate channel is assigned to the instant cooperating group of UEs. The network controller then assigns the candidate channel to the instant cooperating group of UEs, and synchronizes the FBE frame periods of the two groups. If the candidate channel has not been assigned to at least one other cooperating group of UEs with the same minimum FBE frame period as the instant cooperating group of UEs, the network controller repeats the foregoing determination for the next candidate channel on the sorted list. If none of the candidate channels on the sorted list has been assigned to another cooperating group of UEs with the same minimum FBE frame period as the instant cooperating group of UEs, then the network controller assigns the first channel on the sorted list to the instant cooperating group of UEs.

In block 514, the network controller determines a priority class index associated with traffic to be relayed to the TUE. This may involve, for example, mapping at least one QoS parameter associated with the traffic to a priority class index of a hierarchy of priority class indexes, each priority class index in the hierarchy being associated with a respective set of channel access parameters for accessing a channel in the second spectrum band as FBE. For example, each set of channel access parameters may include at least a maximum sidelink burst length and a respective minimum frame period.

In some embodiments, the priority class index-specific sets of channel access parameters are configured to comply with European FBE regulatory requirements. For example, in some embodiments, for each priority class index in the hierarchy, the respective minimum frame period associated with the priority class index exceeds a respective MCOT associated with the priority class index such that a respective minimum idle period between the end of the respective MCOT and the respective minimum frame period is at least 5% of the length of the respective MCOT.

In block 516, the network controller transmits a group-specific CPC message to the at least one TP for transmission to the cooperating group of UEs over the first spectrum band. In some embodiments, the group-specific CPC message includes information indicating a priority class index associated with traffic to be relayed to the TUE over the second spectrum band, and the cooperating UEs of the group use this information to look up a priority class index-specific set of channel access parameters corresponding to the priority class index associated with the traffic to be relayed to the TUE. The CUE(s) in the group may then use the priority class index-specific set of channel access parameters to access a channel in the second spectrum band as FBE to relay traffic to the TUE. In other embodiments, the group-specific CPC message includes information indicating the priority class index-specific set of channel access parameters corresponding to the priority class index associated with traffic to be relayed to the TUE.

In some embodiments, each priority class index-specific set of channel access parameters includes a maximum sidelink burst length parameter and a minimum frame period parameter. In some cases, the maximum sidelink burst length parameter and the minimum frame period parameter are each defined as an integer multiple of a transmission time unit associated with communications in the first spectrum band.

In some embodiments, the group-specific CPC message further comprises information indicating the channel assigned to the cooperating UE group to use for D2D sidelink transmission over the second spectrum band, and information indicating a reference time point, $t_0$, to start cycles of the frame period to access the channel in the second spectrum band as FBE. In some cases, the group-specific CPC message also includes information indicating a length of a response message that the TUE is configured to transmit over the second spectrum band to indicate an end to sidelink transmission to the TUE.

The example operations 500 are illustrative of an example embodiment. Various ways to perform the illustrated operations, as well as examples of other operations that may be performed, are described herein. Further variations may be or become apparent.

Figure 11:
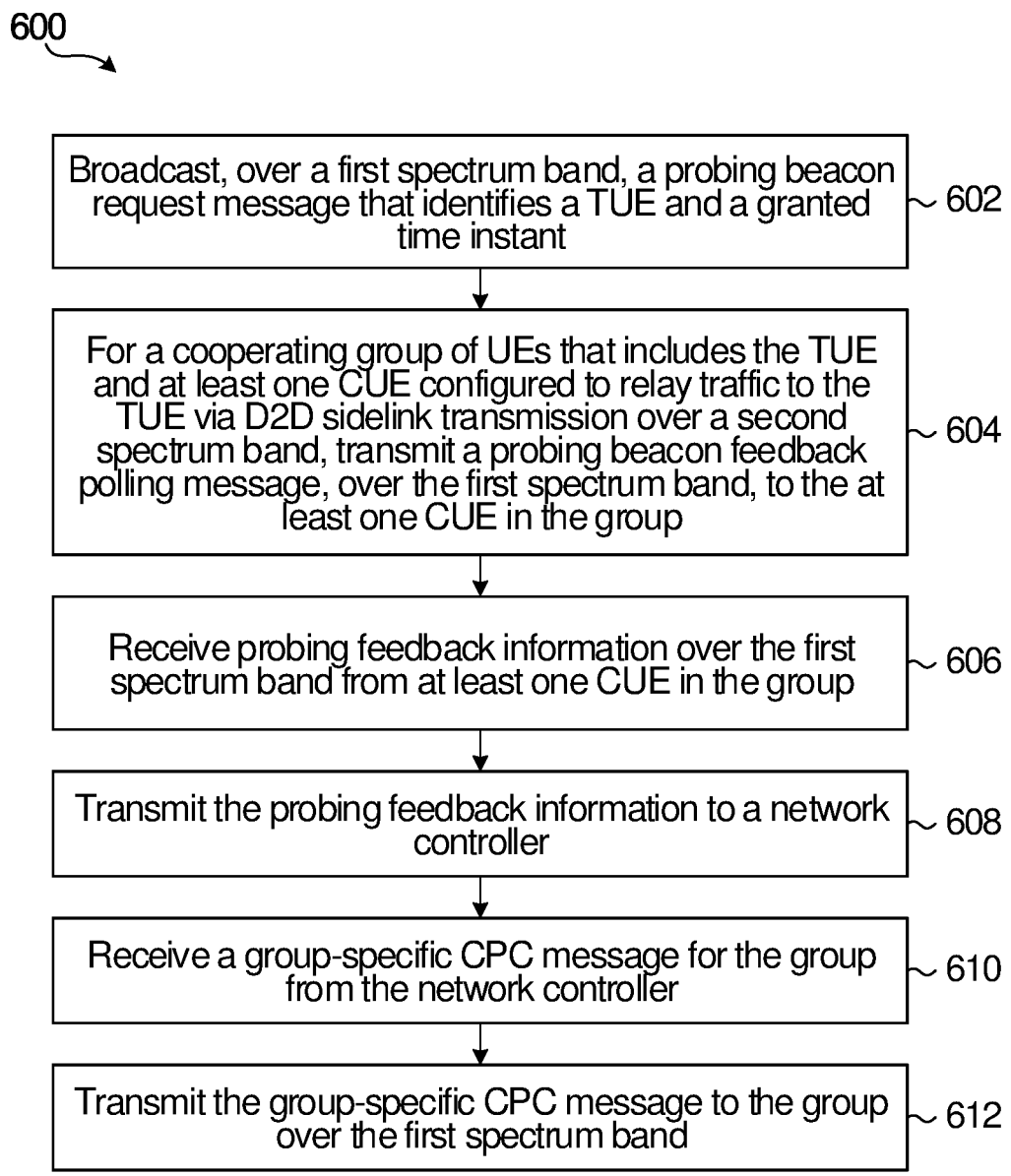
FIG. 11 is a flow diagram of examples operations in a transmit point in accordance with an embodiment of the present disclosure.

FIG. 11 illustrates a flow diagram of example operations 600 in a transmit point according to example embodiments described herein.

In block 602, the transmit point broadcasts, over a first spectrum band, a probing beacon request message identifying a TUE and a granted time instant. The probing beacon request message acts as an instruction to the TUE to broadcast a probing beacon on a channel in a second spectrum band at the granted time instant. This may involve, for example, receiving a probing beacon message from a network controller over a backhaul connection, encoding the probing beacon message received from the network controller to generate the probing beacon request message and broadcasting the probing beacon request message over the first spectrum band. In some embodiments, the first spectrum band is a licensed spectrum band and the second spectrum band is an unlicensed spectrum band. The probing beacon request message also acts as an instruction to candidate cooperating UEs to measure and store a received signal strength of the probing beacon transmitted by the TUE.

In block 604, the transmit point transmits a probing beacon feedback polling message, over the first spectrum band, to at least one CUE in a cooperating group of UEs that includes the TUE and the at least one CUE configured to relay traffic to the TUE via D2D sidelink transmission over a second spectrum band. The polling message instructs the at least one CUE to provide probing feedback information indicating received signal strengths of probing beacons transmitted by TUEs, including the TUE of the instant cooperating group of UEs, and corresponding TUE IDs. In some embodiments, the transmit point receives a polling message from a network controller over a backhaul connection, encodes the polling message received from the network controller to generate an encoded polling message, and transmits the encoded polling message over the first spectrum band.

In block 606, the transmit point receives probing feedback information over the first spectrum band from at least one CUE in the cooperating group of UEs.

In block 608, the transmit point transmits the probing feedback information to a network controller.

In block 610, the transmit point receives a group-specific CPC message for the cooperating group of UEs from the network controller. This may involve, for example, receiving the group-specific CPC message from the network controller over a backhaul connection, encoding the group-specific CPC message received from the network controller to generate an encoded group-specific CPC message and transmitting the encoded group-specific CPC message over the first spectrum band. In some embodiments, the group-specific CPC message includes information indicating a channel in the second spectrum band that has been assigned to the cooperating group of UEs for D2D sidelink transmission over the second spectrum band and either information indicating a priority class index associated with traffic to be relayed to the TUE or information indicating a priority class index-specific set of channel access parameters to use to access the second spectrum band as FBE to relay traffic to the TUE.

In block 612, the transmit point transmits the group-specific CPC message to the cooperating group of UEs over the first spectrum band.

The example operations 600 are illustrative of an example embodiment. Various ways to perform the illustrated operations, as well as examples of other operations that may be performed, are described herein. Further variations may be or become apparent.

Figure 12:
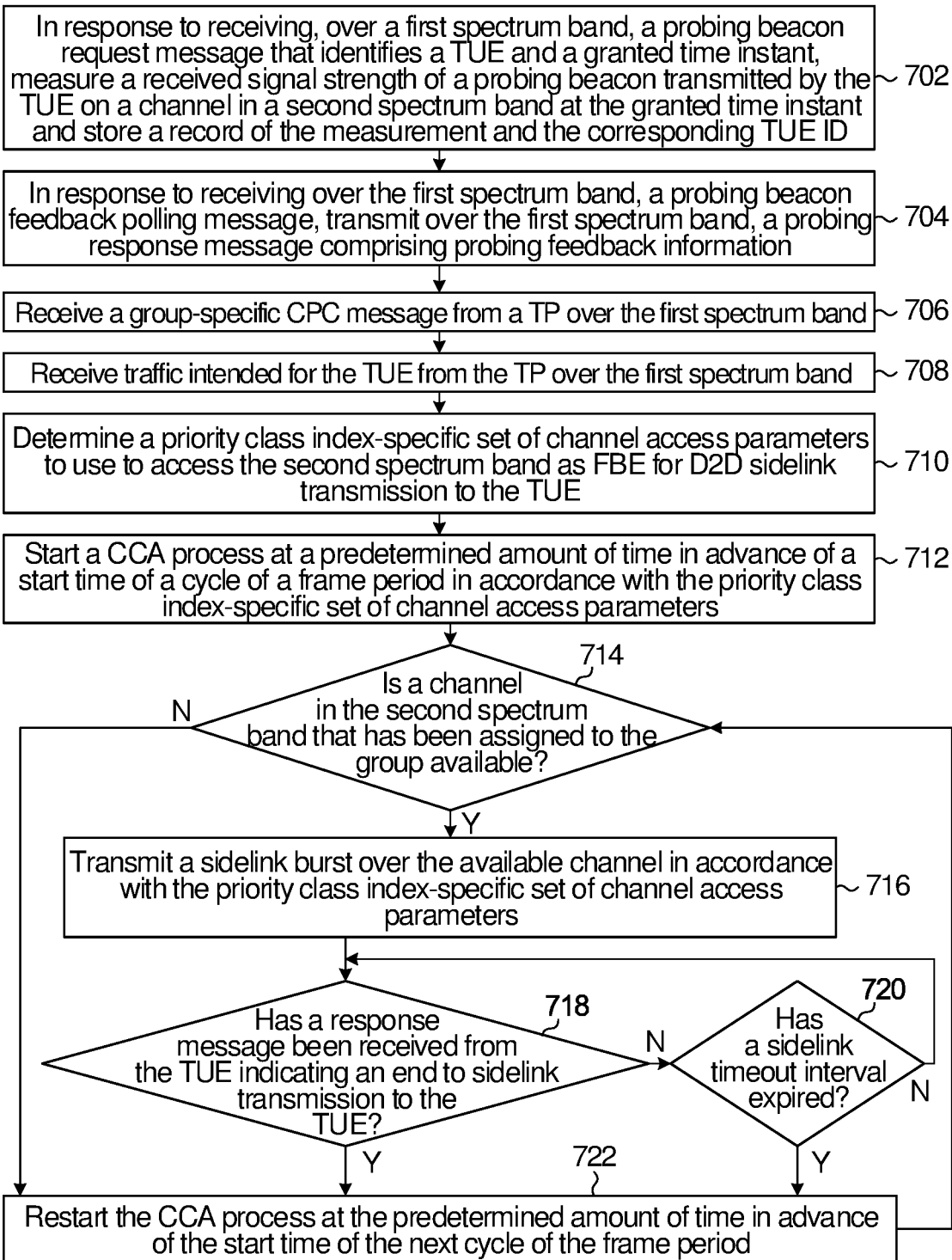
FIG. 12 is a flow diagram of examples operations in a UE operating as a CUE in a cooperating group of UEs in accordance with an embodiment of the present disclosure.

FIG. 12 illustrates a flow diagram of example operations 700 in a UE operating in a cooperating mode as a CUE in a cooperating group of UEs in accordance with an embodiment of the present disclosure.

In block 702, in response to receiving a probing beacon listen message from the TP over a first spectrum band, the CUE measures a received signal strength of a probing beacon transmitted by a TUE on a channel in a second spectrum band. In some embodiments, the channel is a dedicated probing channel. In some embodiments, the first spectrum band is a licensed spectrum band and the second spectrum band is an unlicensed spectrum band.

In block 704, in response to receiving a polling message from the TP over the first spectrum band, the CUE transmits a probing response message comprising probing feedback information to a TP over the first spectrum band. The probing response message includes probing feedback information indicating received signal strengths of probing beacons transmitted by TUEs, including the TUE of the instant cooperating group of UEs, and corresponding TUE identifiers (TUE IDs).

In block 706, the CUE receives a group-specific CPC message from the TP over the first spectrum band. The group-specific CPC message includes information related to a priority class index associated with traffic intended for the TUE. In some embodiments, this information includes information indicating a priority class index associated with traffic to be relayed to the TUE or information indicating a priority class index-specific set of channel access parameters to use to access the second spectrum band as FBE to relay traffic to the TUE, such as a maximum sidelink burst length parameter and a minimum frame period parameter. In some embodiments, the group-specific CPC message includes information indicating a channel in the second spectrum band that has been assigned to the cooperating group of UEs for D2D sidelink transmission over the second spectrum band.

In block 708, the CUE receives traffic intended for the TUE from the TP over the first spectrum band.

In block 710, the CUE determines a priority class index-specific set of channel access parameters to use to access the second spectrum band as FBE for D2D sidelink transmission to the TUE. In particular, the CUE makes this determination based at least in part on the information in the group-specific CPC message related to a priority class index associated with traffic intended for the TUE.

In block 712, the CUE starts a CCA process at a predetermined amount of time in advance of a start time of a cycle of a frame period in accordance with the priority class index-specific set of channel access parameters.

In block 714, the CUE determines whether the CCA process indicates that a channel in the second spectrum band that has been assigned to the group is available. If so, in block 716, the CUE transmits a sidelink burst over the available channel in accordance with the priority class index-specific set of channel access parameters, the sidelink burst including at least a portion of the received traffic intended for the TUE. This may involve, for example, transmitting, over the available channel in the second spectrum band, a sidelink burst in accordance with a maximum sidelink burst length parameter specified in the priority class index-specific set of channel access parameters determined in block 710.

In some embodiments, the sidelink burst spans a majority of the bandwidth of the available channel and is orthogonal to other in-group synchronous sidelink bursts transmitted by other CUEs in the group.

In some embodiments, the CUE receives traffic intended for the TUE from multiple TPs. In some such cases, transmitting a sidelink burst in block 716 involves either augmenting the traffic received from different TPs in the payload of the sidelink burst or multiplexing the traffic received from different TPs in the frequency domain or the time domain.

If the CUE determines in block 714 that the CCA process started in block 712 indicates that the channel is busy, then the operations proceed to block 722, in which the CUE restarts the CCA process for the next cycle of the frame period as described above.

After transmitting the sidelink burst in block 716, the CUE determines in block 718 whether a response message has been received from the TUE indicating an end to sidelink transmission to the TUE. If so, then the operations proceed to block 722, in which the CUE restarts the CCA process at the predetermined amount of time in advance of the start time of the next cycle of the frame period.

The example operations 700 are illustrative of an example embodiment. Various ways to perform the illustrated operations, as well as examples of other operations that may be performed, are described herein. Further variations may be or become apparent.

Figure 13:
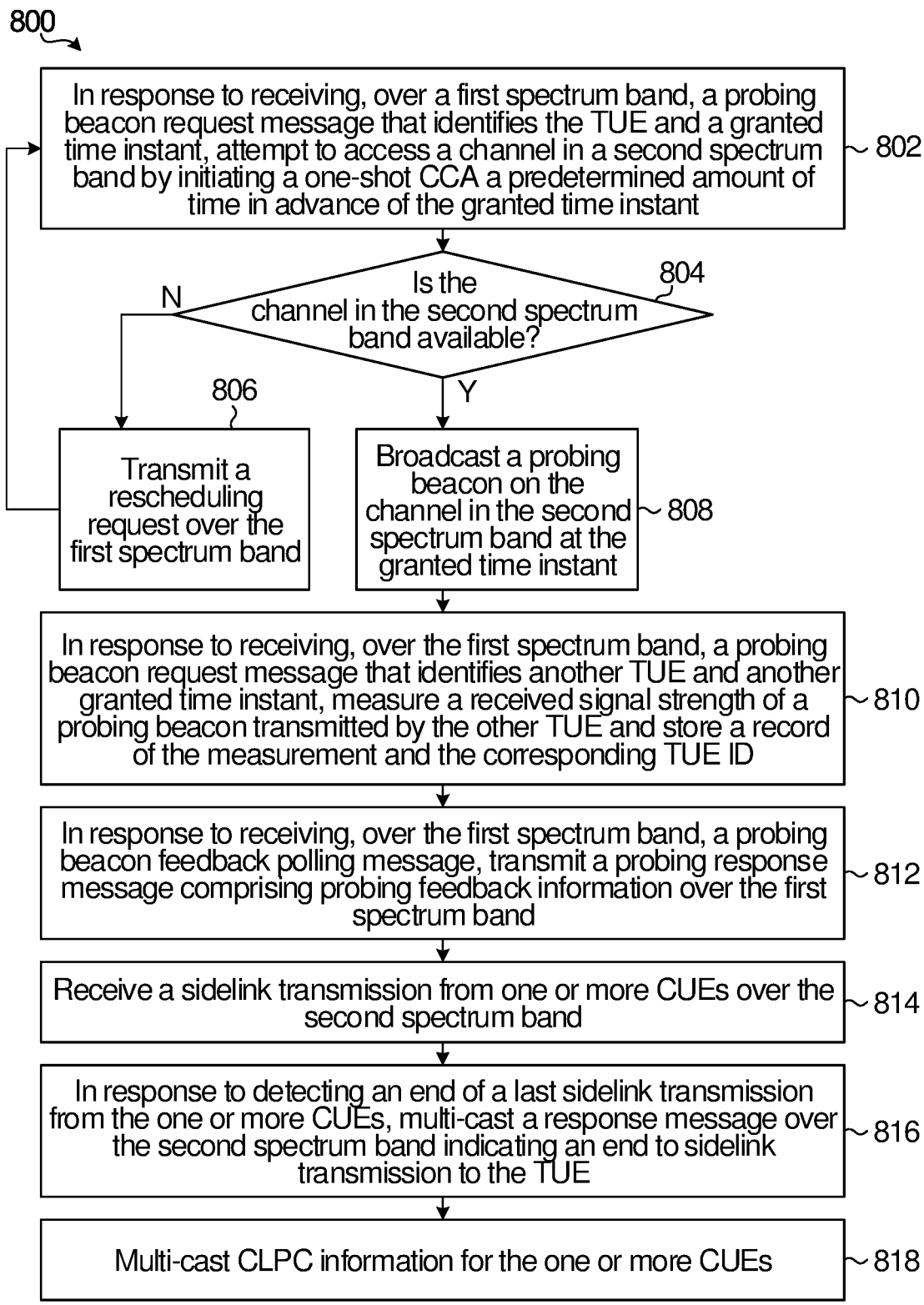
FIG. 13 is a flow diagram of examples operations in a UE operating as a TUE in a cooperating group of UEs in accordance with an embodiment of the present disclosure.

FIG. 13 illustrates a flow diagram of example operations 800 in a UE operating in a cooperating mode as a TUE in a cooperating group of UEs in accordance with an embodiment of the present disclosure.

In block 802, in response to receiving a probing beacon request message from a TP over a first spectrum band, the TUE attempts to access a channel in a second spectrum band by initiating a one-shot CCA a predetermined amount of time in advance of a granted time instant indicated in the probing beacon request message. The TUE does this by initiating a one-shot CCA a predetermined time in advance of the granted time instant, where the predetermined time is the duration of the one-shot CCA, so that the TUE can begin transmitting at the granted time if the CCA is successful. In some embodiments, the first spectrum band is a licensed spectrum band and the second spectrum band is an unlicensed spectrum band.

In block 804, the TUE determines whether the CCA process indicates that the channel in the second spectrum band is available. If not, then the operations proceed to block 806, in which the TUE transmits a rescheduling request to the TP over the first spectrum band requesting that the TUE's granted time instant for transmission of the probing beacon be rescheduled.

If the TUE determines in block 804 that the CCA process started in block 802 indicates that the channel is available, then the operations proceed to block 808, in which the TUE transmits the probing beacon on the channel in the second spectrum band at the granted time instant.

In block 810, in response to receiving a probing beacon listen message from the TP over the first spectrum band, the TUE measures a received signal strength of probing beacons transmitted by other TUE(s) and stores a record of the measurements and corresponding TUE IDs.

In block 812, in response to receiving a polling message from the TP over the first spectrum band, the TUE transmits a probing response message to the TP over the first spectrum band. The probing response message includes probing feedback information based on the TUE's stored record of measured received signal strengths of probing beacons transmitted by other TUEs and corresponding TUE IDs. In some embodiments, the probing feedback information is limited to information regarding probing beacons that were received with a signal strength greater than a threshold.

In block 814, the TUE receives a sidelink transmission from one or more CUEs over the second spectrum band.

In block 816, in response to detecting an end of a last sidelink transmission from the one or more CUEs, the TUE multi-casts a response message over the second spectrum band to indicate an end to sidelink transmission to the TUE. In some embodiments, the TUE multi-casts the response message after SIFS. In some embodiments, the response message includes symbols transmitted at a reference power level for sidelink channel measurement at the CUE(s).

In block 818, the TUE multi-casts CLPC information for the one or more CUEs. The CLPC information may be appended to the response message. The CLPC information may include, for each CUE serving the TUE, a dynamic CLPC command indicating a signed power offset to be applied to the transmit power of the CUE. In some embodiments, if the sidelink transmission received by the TUE in block 814 is associated with a given HARQ process ID, then for each CUE that is assisting with the given HARQ process ID and from which a sidelink transmission was not received in block 814, the CLPC information that the TUE multi-casts in block 818 includes a dynamic CLPC command to decrease the CUE's transmit power.

The example operations 800 are illustrative of an example embodiment. Various ways to perform the illustrated operations, as well as examples of other operations that may be performed, are described herein. Further variations may be or become apparent.

Figure 14:
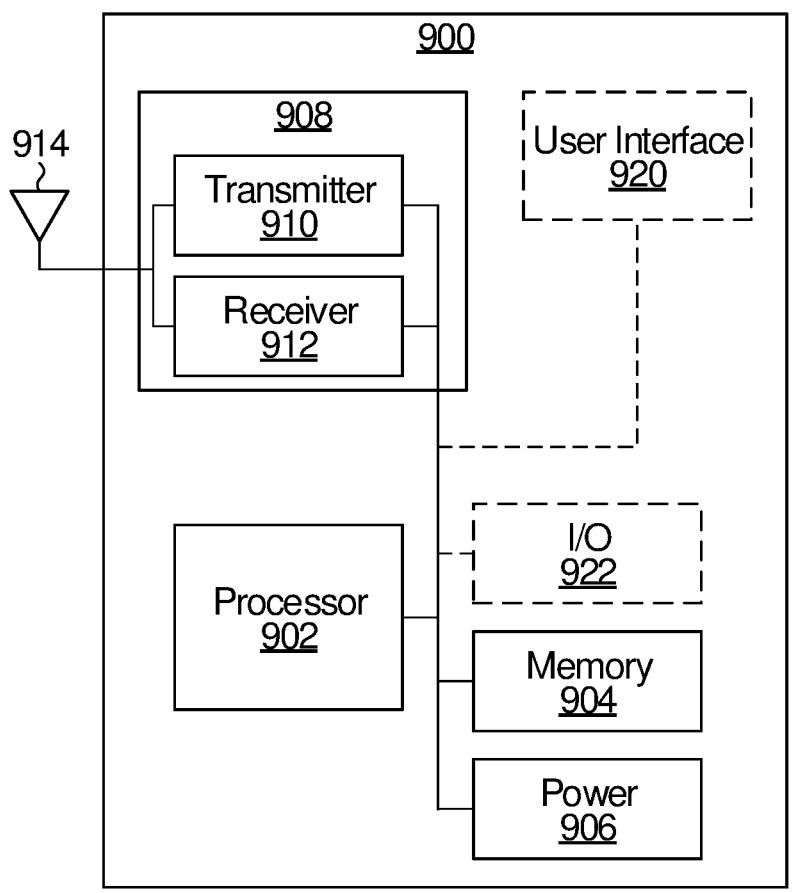
FIG. 14 is a block diagram of a UE according to an embodiment of the present disclosure.

FIG. 14 shows one embodiment of a UE 900 for implementing methods described herein. The UE 900 may include a processor 902, a memory 904, a power source 906 and a wireless communications interface 908 for sending and receiving data in a communications network, such as the network 100 shown in FIG. 2, which components may or may not be arranged as shown in FIG. 14. The wireless communications interface 908 includes a transmitter 910 and a receiver 912 coupled to an antenna 914. The wireless communications interface 908 is configured to communicate with network TPs over a first licensed spectrum band and to communicate with other UEs via D2D sidelink communications over a second unlicensed spectrum band as described herein. It will be appreciated that the functions of the wireless communications interface 908 may be carried out by different transceiver or modem components including multiple transmitter, receiver, digital signal processor (DSP) and antenna components or arrays. In one embodiment, the UE 900 includes a user interface 920 and various inputs/outputs (I/O) 922 such as a display, audio input, audio output, keypads, buttons, microphones or other inputs or outputs. The memory 904 may store programming and/or instructions for the processor 902 including instructions for sending, receiving, processing and supporting different services and types of data, such as but not limited to video, VoIP calls, web browsing data, email and other text communications.

Figure 15:
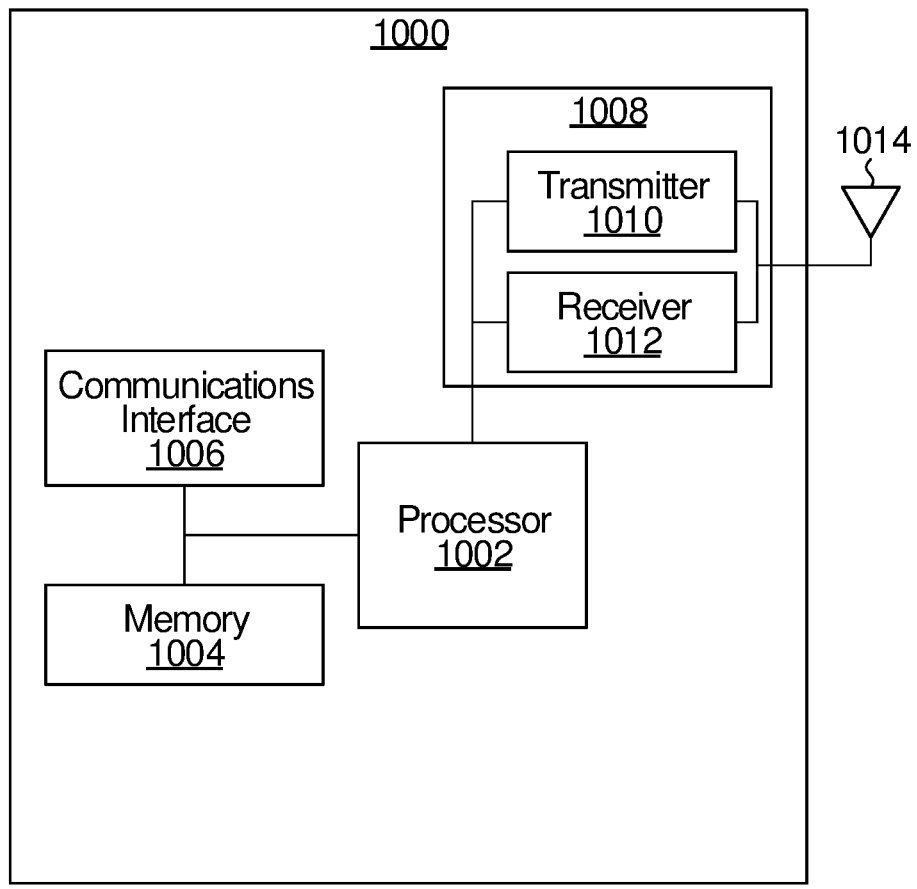
FIG. 15 is a block diagram of a network device according to an embodiment of the present disclosure.

FIG. 15 illustrates a network device 1000 according to an embodiment of the present application. The network device 1000 may comprise a processor 1002, a memory 1004, one or more communications interfaces 1006, 1008. The communications interface 1006 may be a wired or wireless interface for sending and receiving data to a backhaul network or to other network nodes, gateways or relays in a network, such as the network 100 shown in FIG. 2. The wireless communications interface 1008 is configured to send and receive data with one or more UEs, including functions such as, but not necessarily limited to, transmitting probing beacon request messages, transmitting probing beacon feedback polling messages, receiving probing feedback from candidate UEs, transmitting group-specific CPC messages to cooperating groups of UEs, and transmitting downlink information intended for TUEs in the cooperating groups of UEs, as described previously. It will be appreciated that the functions of the wireless communications interface 1008 may be carried out by different transceiver or modem components including multiple transmitter, receiver and antenna components or arrays. The memory 1004 may store programming and/or instructions for the processor 1002, including instructions for sending and receiving data to and from a UE.

Some embodiments are configured to satisfy various constraints or regulations affecting D2D sidelink transmission format. In a specific example, from ETSI EN 301 893 V.1.7.1 (2012-06), the following requirements apply to any unlicensed spectrum transmissions in the 5 GHz band:

The nominal channel bandwidth shall be at least 5 MHz at all times. The nominal channel bandwidth is the widest band of frequencies, inclusive of guard bands, assigned to a single channel.

The occupied channel bandwidth shall be between 80% and 100% of the declared nominal channel bandwidth. In case of smart antenna systems (devices with multiple transmit chains) each of the transmit chains shall meet this requirement. The occupied channel bandwidth is the bandwidth containing 99% of the power of the signal.

A power constraint and per MHz power spectral density (PSD) constraint requires that a signal which occupies a small portion of the nominal bandwidth cannot be transmitted at the maximum transmission power available at the UE due to the PSD constraint.

The constraints or regulations in place for a given application may have an effect on the specifics of implementation. Examples of how these constraints may be applied are given below. However, it should be understood that the bandwidth and power constraints are specific examples. The methods and systems described herein can be adapted to different contexts in which such constraints are not in place, or in which differing constraints are in place.

In some embodiments, sidelink transmissions are maintained orthogonal to other in-group sidelink synchronous transmissions in the frequency-domain, e.g., via interleaved-frequency division multiple access (I-FDMA) or resource block (RB) multi-clustering, or in the code-domain, e.g., via code division multiple access (CDMA). In other embodiments, sidelink transmissions are spread across a channel BW using a non-orthogonal multiple access scheme, such as low density spreading (LDS), non-orthogonal multiple access, or sparse code multiple access (SCMA).

I-FDMA is a special case of distributed-FDMA (D-FDMA) where the mapped sub-carriers span the whole bandwidth for a given channel; i.e., $N=Q*M$, where Q is the equidistance factor between the mapped subcarriers, N is the total number of subcarriers, and M is the number of subcarriers allocated to one UE. I-FDMA has lower PAPR compared to single carrier-FDMA (SC-FDMA) and D-FDMA because its modulated time domain symbols are simply a repetition of the original input symbols. One advantage of I-FDMA over D-FDMA and SC-FDMA is the lower complexity at the transmitter side because the modulated symbols can be generated strictly in the time domain, without a need for DFT/IDFT at the transmitter.

RB multi-clustering, also called RB-Interleaved FDMA (RB-I-FDMA) or Clustered DFT-Spread OFDM, is a multi-cluster version of SC-FDMA in which multiple non-contiguous resource clusters are allocated to a single UE within a single carrier. In some embodiments, a simplified version of clustered DFT-Spread OFDM with up to 2 non-contiguous cluster resource allocations per UE is employed. The PAPR of Clustered-DFT-Spread OFDM is slightly worse than that of SC-FDMA. Depending on the size of the each cluster, filtering can be applied to clustered DFT-Spread OFDM.

In some embodiments, an RB multi-clustering system is designed such that each UE occupies at least one RB per MHz of spectrum. This permits the UE to transmit at full power and spread its signal across the whole carrier in order to fulfill the 80% bandwidth occupancy requirement and per MHz PSD constraint that may be imposed in the unlicensed spectrum.

If the UE resource allocation is not spread over a large enough bandwidth, then a UE may not be able to use its full power to transmit because of the per MHz power spectral density constraint in the unlicensed spectrum.

Transmitting with more power results in a larger coverage area and therefore reaching the TUEs and also silencing more potential interferers because they would sense the channel is busy. The I-FDMA and RB multi-clustering waveforms described above may be more suitable for UE cooperation in the unlicensed spectrum than conventional SC-FDMA waveforms. They feature better UE multiplexing capability in the frequency domain, and allow conformance with 80% bandwidth occupancy requirements and per MHz PSD constraints in the unlicensed spectrum.

A disadvantage of I-FDMA interleaved waveforms is that they cannot be used in conjunction with sub-band filtering and therefore cannot benefit from better protection against inter-carrier interference (ICI) provided by sub-band filtering.

RB multi-clustering allows meeting the bandwidth occupancy requirements and power density constraints that may be imposed in the unlicensed spectrum, and can be used in conjunction with filtering to allow more robustness against inter-carrier interference (ICI) as well as carrier frequency offset (CFO) mismatch between CUEs and TUE. Disadvantages of RB multi-clustering include the relatively higher PAPR compared to I-FDMA and the added complexity at the terminal side given that multiple sub-band filters need to be used. Also, due to the frequency localization of the sub-band filters which are typically quite small (one RB or a couple of RBs), filtering performance can be degraded.

In some embodiments, a group-based flexible nominal bandwidth configuration is combined with a filtered version of RB multi-clustering in order to leverage the benefits of both approaches. The group-based flexible nominal bandwidth configuration allows multiplexing different Hyper UEs across adjacent nominal channel bandwidths without co-channel interference between different Hyper UEs. The Filtered-Interleaved waveform (RB-level interleaving) allows multiplexing different CUEs within the same nominal channel bandwidth while meeting bandwidth occupancy requirements and PSD constraints that may be imposed in unlicensed spectrum.

Embodiments of the present disclosure automatically achieve in-group sidelink synchronization due to the periodic LBT procedure, which means that the TUE does not need to perform blind detection to receive in-group sidelink transmissions.

Embodiments of the present disclosure may also avoid or at least reduce inter-group SL2SL interference through optimized assignment of unlicensed component carriers.

Embodiments of the present disclosure also provide QoS differentiation based on the QoS priority class of the TUE.

Embodiments of the present disclosure may also improve the efficiency of sidelink CCA when multiple CUEs are selected for cooperation.

Embodiment of the present disclosure may also improve coexistence fairness with existing technologies that may be operating in unlicensed spectrum, such as WLAN. For example, determining the CCA starting point based on earliest subframe alignment in accordance with one aspect of the present disclosure, rather than immediately after an unlicensed spectrum channel becomes idle, may give coexisting WLAN nodes an advantage that is balanced by the aggressive nature of the ED-based only SL LBT process that may be employed in some embodiments of the present disclosure.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

EXAMPLE EMBODIMENTS

The following provides a non-limiting list of example embodiments of the present disclosure:

Example 1. A method in a network node of a wireless communication network, the method comprising:

for a cooperating group of user equipments (UEs) that includes a target UE (TUE) and at least one cooperating UE (CUE) configured to relay traffic, received over a first spectrum band and intended for the TUE, to the TUE via device-to-device (D2D) sidelink transmission over a second spectrum band, transmitting a group-specific common-parameters configuration (CPC) message to at least one transmit point (TP) for transmission, over the first spectrum band, to at least a subset of the UEs in the group, the group-specific CPC message comprising at least one of:

information indicating a priority class index associated with traffic to be relayed to the TUE over the second spectrum band; and information indicating a priority class index-specific set of channel access parameters for the at least one CUE in the group to use to access a channel in the second spectrum band as frame based equipment (FBE) to relay traffic to the TUE, the priority class index-specific set of channel access parameters corresponding to the priority class index associated with traffic to be relayed to the TUE.

Example 2. The method of Example 1, wherein the information indicating a priority class index-specific set of channel access parameters corresponding to the priority class index associated with traffic to be relayed to the TUE comprises information indicating a maximum sidelink burst length and a minimum frame period.

Example 3. The method of Example 2, wherein the maximum sidelink burst length and the minimum frame period are each defined as an integer multiple of a transmission time unit (TTU) associated with communications in the first spectrum band.

Example 4. The method of Example 3, wherein the TTU of the first spectrum band is a subframe duration, a slot duration or a symbol duration associated with communications in the first spectrum band.

Example 5. The method of Example 2, wherein the group-specific CPC message further comprises information indicating a reference time point, to, to start cycles of the frame period to access a channel in the second spectrum band as FBE.

Example 6. The method of Example 1, wherein the group-specific CPC message further comprises information indicating a length of a response message that the TUE is configured to transmit over the second spectrum band to indicate an end to sidelink transmission to the TUE.

Example 7. The method of Example 6, wherein the length of the response message is defined as an integer multiple of a symbol duration associated with communications in the first spectrum band.

Example 8. The method of Example 1, wherein the group-specific CPC message further comprises information indicating a selected channel in the second spectrum band for the at least one CUE of the group to access as frame based equipment (FBE) to relay traffic to the TUE.

Example 9. The method of Example 2, further comprising determining the priority class index associated with traffic to be relayed to the TUE by mapping at least one quality of service (QoS) parameter associated with the traffic to one priority class index of a hierarchy of priority class indexes, each priority class index in the hierarchy being associated with a respective maximum sidelink burst length and a respective minimum frame period.

Example 10. The method of Example 9, wherein, for each of at least a subset of the priority class indexes in the hierarchy, the respective minimum frame period associated with the priority class index exceeds a respective maximum channel occupancy time (MCOT) associated with the priority class index such that a respective minimum idle period between the end of the respective MCOT and the respective minimum frame period is at least 5% of the length of the respective MCOT, the respective MCOT encompassing at least the respective maximum sidelink burst length associated with the priority class index.

Example 11. The method of Example 10, wherein for each of the priority class indexes in the hierarchy, the respective MCOT associated with the priority class index encompasses at least the respective maximum sidelink burst length, a reserved fractional symbol duration (RFSD) and a short inter-frame space (SIFS).

Example 12. The method of Example ii, wherein for each of the priority class indexes in the hierarchy, the respective MCOT associated with the priority class index further encompasses a length of a response message that the TUE is configured to transmit over the second spectrum band to indicate an end to sidelink transmission to the TUE.

Example 13. The method of Example 10, wherein two priority class indexes that are adjacent in the hierarchy have the same respective MCOT and different respective minimum frame periods, such that the respective minimum frame period associated with a second one of the two priority class indexes is greater than the respective minimum frame period associated with a first one of the two priority class indexes by an amount of time equal to the duration of the largest transmission time unit (TTU) associated with communications in the first spectrum band.

Example 14. The method of Example 13, wherein the second one of the two priority class indexes is lower in the hierarchy than the first of the two priority class indexes.

Example 15. The method of Example 13, wherein the largest TTU associated with communications in the first spectrum band is a subframe duration associated with communications in the first spectrum band.

Example 16. The method of Example 9, wherein the at least one QoS parameter comprises at least one of: a latency criterion and a throughput rate criterion.

Example 17. The method of Example 1, further comprising transmitting a probing beacon message to the at least one TP to cause the at least one TP to:

broadcast, over the first spectrum band, a probing beacon request message that identifies the TUE and a granted time instant, the probing beacon request message acting as an instruction to the TUE to broadcast a probing beacon on a channel in the second spectrum band at the granted time instant and acting as an instruction to candidate cooperating UEs to measure and store a received signal strength of the probing beacon transmitted by the TUE.

Example 18. The method of Example 18, wherein the channel in the second spectrum band on which the TUE is instructed to transmit the probing beacon is a dedicated probing channel.

Example 19. The method of Example 17, wherein the probing beacon message is transmitted to the at least one TP before the cooperating group of UEs for the TUE is formed.

Example 20. The method of Example 19, further comprising, after the cooperating group of UEs for the TUE has been formed, transmitting a message to the at least one TP to cause the at least one TP to transmit a probing beacon feedback polling message, over the first spectrum band, to the at least one CUE, the probing beacon feedback polling message requesting the at least one CUE to provide probing feedback information indicating received signal strengths of probing beacons transmitted by TUEs, including the TUE of the instant cooperating group of UEs, and corresponding TUE identifiers (TUE IDs).

Example 21. The method of Example 20, further comprising:
for each of a plurality of candidate channels in the second spectrum band, determining a sidelink-to-sidelink interference cost associated with assigning the channel to the cooperating group of UEs to use for D2D sidelink transmission over the second spectrum band; and
assigning a channel in the second spectrum band to the cooperating group of UEs based at least in part on the sidelink-to-sidelink interference costs associated with the plurality of candidate channels.

Example 22. The method of Example 21, wherein the group-specific CPC message further comprises information indicating the channel assigned to the cooperating UE group to use for D2D sidelink transmission over the second spectrum band.

Example 23. The method of Example 21, wherein, for each candidate channel, the sidelink-to-sidelink interference cost associated with assigning the channel to the cooperating group of UEs is a sum of a maximum long-term sidelink-to-sidelink interference that would be observed by the TUE of the cooperating group of UEs and a maximum of long-term sidelink-to-sidelink interference that would be observed by the TUEs of any other groups of cooperating UEs operating on the same candidate channel.

Example 24. The method of Example 23, wherein assigning a channel in the second spectrum band to the cooperating group of UEs based at least in part on the sidelink-to-sidelink interference costs associated with the plurality of candidate channels comprises excluding a candidate channel from consideration for assignment to the cooperating group of UEs if the sum of the maximum sidelink-to-sidelink interference any TUE would receive is greater than a threshold value.

Example 25. The method of Example 21, wherein assigning a channel in the second spectrum band to the cooperating group of UEs based at least in part on the sidelink-to-sidelink interference costs associated with the plurality of candidate channels comprises:
sorting the plurality of candidate channels in an ascending ordered list according to their associated sidelink-to-sidelink interference costs; and
starting from a first candidate channel on the sorted list:
a) determining if the candidate channel has been assigned to at least one other cooperating group of UEs with the same minimum frame period as the instant cooperating group of UEs;
b) in response to determining that the candidate channel has been assigned to at least one other cooperating group of UEs with the same minimum frame period as the instant cooperating group of UEs:
  i) identifying a cooperating group of UEs among the at least one other cooperating group of UEs with the same minimum frame period that would receive the least maximum sidelink-to-sidelink interference if the candidate channel is assigned to the instant cooperating group of UEs;
  ii) assigning the candidate channel to the instant cooperating group of UEs; and
  iii) synchronizing a frame period of the instant cooperating group of UEs with a frame period of the cooperating group of UEs with the same minimum frame period that would receive the least maximum sidelink-to-sidelink interference if the candidate channel is assigned to the instant cooperating group of UEs;
c) in response to determining that the candidate channel has not been assigned to at least one other cooperating group of UEs with the same minimum frame period as the instant cooperating group of UEs and the candidate channel is not the last candidate channel on the sorted list, skipping to a next candidate channel on the sorted list and repeating steps a) to c) for the next candidate channel on the sorted list; and
d) in response to determining that the candidate channel has not been assigned to at least one other cooperating group of UEs with the same minimum frame period as the instant cooperating group of UEs and the candidate channel is the last candidate channel on the sorted list, assigning the first candidate channel on the sorted list to the instant cooperating group of UEs.

Example 26. The method of Example 1, wherein the first spectrum band is a licensed spectrum band and the second spectrum band is an unlicensed spectrum band.

Example 27. A method in a transmit point (TP) of a wireless communication network, the method comprising:
transmitting, over a first spectrum band, a group-specific common-parameters configuration (CPC) message to user equipments (UEs) in a cooperating group of UEs that includes a target UE (TUE) and at least one cooperating UE (CUE) configured to relay traffic, received over the first spectrum band and intended for the TUE, to the TUE via device-to-device (D2D) sidelink transmission over a second spectrum band, the group-specific CPC message comprising at least one of:
information indicating a priority class index associated with traffic to be relayed to the TUE over the second spectrum band; and
information indicating a priority class index-specific set of channel access parameters for the at least one CUE in the group to use to access a channel in the second spectrum band as frame based equipment (FBE) to relay traffic to the TUE, the priority class index-specific set of channel access parameters corresponding to the priority class index associated with traffic to be relayed to the TUE.

Example 28. The method of Example 27, wherein the information indicating a priority class index-specific set of channel access parameters corresponding to the priority class index associated with traffic to be relayed to the TUE comprises information indicating a maximum sidelink burst length and a minimum frame period.

Example 29. The method of Example 28, wherein the maximum sidelink burst length and the minimum frame period are each defined as an integer multiple of a transmission time unit (TTU) associated with communications in the first spectrum band.

Example 30. The method of Example 29, wherein the TTU of the first spectrum band is a subframe duration, a slot duration or a symbol duration associated with communications in the first spectrum band.

Example 31. The method of Example 28, wherein the group-specific CPC message further comprises information indicating a reference time point, to, to start cycles of the frame period to access a channel in the second spectrum band as FBE.

Example 32. The method of Example 27, wherein the group-specific CPC message further comprises information indicating a length of a response message that the TUE is configured to transmit over the second spectrum band to indicate an end to sidelink transmission to the TUE.

Example 33. The method of Example 32, wherein the length of the response message is defined as an integer multiple of a symbol duration associated with communications in the first spectrum band.

Example 34. The method of Example 27, wherein the group-specific CPC message further comprises information indicating a selected channel in the second spectrum band for the at least one CUE of the group to access as frame based equipment (FBE) to relay traffic to the TUE.

Example 35. The method of Example 28, further comprising determining the priority class index associated with traffic to be relayed to the TUE by mapping at least one quality of service (QoS) parameter associated with the traffic to one priority class index of a hierarchy of priority class indexes, each priority class index in the hierarchy being associated with a respective maximum sidelink burst length and a respective minimum frame period.

Example 36. The method of Example 35, wherein, for each of at least a subset of the priority class indexes in the hierarchy, the respective minimum frame period associated with the priority class index exceeds a respective maximum channel occupancy time (MCOT) associated with the priority class index such that a respective minimum idle period between the end of the respective MCOT and the respective minimum frame period is at least 5% of the length of the respective MCOT, the respective MCOT encompassing at least the respective maximum sidelink burst length associated with the priority class index.

Example 37. The method of Example 36, wherein for each of the priority class indexes in the hierarchy, the respective MCOT associated with the priority class index encompasses at least the respective maximum sidelink burst length, a reserved fractional symbol duration (RFSD) and a short inter-frame space (SIFS).

Example 38. The method of Example 37, wherein for each of the priority class indexes in the hierarchy, the respective MCOT associated with the priority class index further encompasses a length of a response message that the TUE is configured to transmit over the second spectrum band to indicate an end to sidelink transmission to the TUE.

Example 39. The method of Example 36, wherein two priority class indexes that are adjacent in the hierarchy have the same respective MCOT and different respective minimum frame periods, such that the respective minimum frame period associated with a second one of the two priority class indexes is greater than the respective minimum frame period associated with a first one of the two priority class indexes by an amount of time equal to the duration of the largest transmission time unit (TTU) associated with communications in the first spectrum band.

Example 40. The method of Example 39, wherein the second one of the two priority class indexes is lower in the hierarchy than the first of the two priority class indexes.

Example 41. The method of Example 39, wherein the largest TTU associated with communications in the first spectrum band is a subframe duration associated with communications in the first spectrum band.

Example 42. The method of Example 35, wherein the at least one QoS parameter comprises at least one of: a latency criterion and a throughput rate criterion.

Example 43. The method of Example 27, wherein the first spectrum band is a licensed spectrum band and the second spectrum band is an unlicensed spectrum band.

Example 44. A method in user equipment (UE), the method comprising:

in a cooperation mode, in which the UE acts as a cooperating UE (CUE) in a cooperating group of UEs for a target UE (TUE):
receiving a group-specific common-parameters configuration (CPC) message from a transmit point (TP) over a first spectrum band, the group-specific CPC message comprising information related to a priority class index associated with traffic intended for the TUE;
receiving traffic intended for the TUE from the TP over the first spectrum band; and
accessing a second spectrum band as frame based equipment (FBE) in accordance with a priority class index-specific set of channel access parameters corresponding to the priority class index associated with the traffic intended for the TUE to relay the traffic to the TUE via device-to-device (D2D) sidelink transmission over the second spectrum band.

Example 45. The method of Example 44, wherein the information related to a priority class index associated with traffic intended for the TUE comprises at least one of:
the priority class index associated with the traffic intended for the TUE; and
at least a subset of the channel access parameters of the priority class index-specific set of channel access parameters.

Example 46. The method of Example 44, wherein the group-specific CPC message further comprises information indicating a selected channel in the second spectrum band for CUEs in the group to access as frame based equipment (FBE) to relay traffic to the TUE.

Example 47. The method of Example 44, wherein the priority class index-specific set of channel access parameters corresponding to the priority class index associated with traffic intended for the TUE comprises a maximum sidelink burst length parameter and a minimum frame period parameter.

Example 48. The method of Example 47, wherein:
the group-specific CPC message further comprises information indicating a reference time point, $t_0$, to start cycles of the frame period for accessing the second spectrum band as FBE; and
the method further comprises setting the frame period for accessing the second spectrum band as FBE according to the minimum frame period parameter and starting a cycle of the frame period at the reference time point, $t_0$.

Example 49. The method of Example 48, wherein accessing the second spectrum band as FBE comprises starting a clear channel assessment (CCA) process at a predetermined amount of time in advance of a start time of a cycle of the frame period for accessing the second spectrum band as FBE.

Example 50. The method of Example 49, wherein the predetermined amount of time is a point coordination function inter-frame space (PIFS) interval that is at most 25 μs long.

Example 51. The method of Example 49, wherein accessing the second spectrum band as FBE further comprises, in response to the CCA process indicating that a channel in the second spectrum band that has been assigned to the group is available, transmitting, over the available channel in the second spectrum band, a sidelink burst in accordance with the maximum sidelink burst length parameter, the sidelink burst including at least a portion of the received traffic intended for the TUE.

Example 52. The method of Example 51, further comprising:

receiving traffic intended for the TUE from at least one other TP over the first spectrum band, wherein transmitting, over the available channel in the second spectrum band, a sidelink burst in accordance with the maximum sidelink burst length parameter comprises either augmenting the traffic received from different TPs in the payload of the sidelink burst or multiplexing the traffic received from different TPs in the frequency domain or the time domain.

Example 53. The method of Example 51, wherein the sidelink burst spans a majority of the bandwidth of the available channel and is orthogonal to other in-group synchronous sidelink bursts transmitted by other CUEs in the group.

Example 54. The method of Example 49, wherein accessing the second spectrum band as FBE further comprises, in response to the CCA process indicating that a channel in the second spectrum band that has been assigned to the group is not available, restarting the CCA process at the predetermined amount of time in advance of the start time of the next cycle of the frame period.

Example 55. The method of Example 44, further comprising:
in response to receiving a probing beacon request message from the TP over the first spectrum band, the probing beacon request message identifying the TUE and a granted time instant, measuring a received signal strength of a probing beacon transmitted by the TUE on a channel in the second spectrum band at the granted time instant.

Example 56. The method of Example 55, further comprising:
in response to receiving a probing beacon feedback polling message from the TP over the first spectrum band, transmitting a probing response message to the TP over the first spectrum band, the probing response message comprising probing feedback information indicating received signal strengths of probing beacons transmitted by TUEs, including the TUE of the instant cooperating group of UEs, and corresponding TUE identifiers (TUE IDs).

Example 57. The method of Example 44, wherein the first spectrum band is a licensed spectrum band and the second spectrum band is an unlicensed spectrum band.

Example 58. The method of Example 44, further comprising:
in a target mode, in which the UE acts a target UE (TUE) in a cooperating group of UEs that includes the TUE and at least one cooperating UE (CUE):
in response to receiving a probing beacon request message from a TP over the first spectrum band, the probing beacon request message including information indicating grant of a time instant to the TUE to transmit a probing beacon on a channel in the second spectrum band, initiating a clear channel assessment (CCA) a predetermined time in advance of the granted time instant; and
in response to the CCA indicating that the channel is available, broadcasting the probing beacon on the channel in the second spectrum band at the granted time instant.

Example 59. The method of Example 58, wherein, in the target mode, in response to the CCA indicating that the channel is not available, transmitting a rescheduling request to the TP over the first spectrum band, the rescheduling request requesting that the TUE's granted time instant for transmission of the probing beacon be rescheduled.

Example 60. The method of Example 58, further comprising, in the target mode, in response to receiving a probing beacon request message from the TP over the first spectrum band, the probing beacon request message indicating grant of a time instant to another TUE to transmit a probing beacon on a channel in the second spectrum band:
measuring a received signal strength of a probing beacon broadcasted by the other TUE on the channel in the second spectrum band at the granted time instant; and
storing a record of measured received signal strengths of probing beacons transmitted by other TUEs and corresponding TUE IDs.

Example 61. The method of Example 60, further comprising, in the target mode, in response to receiving a polling message from the TP over the first spectrum band, transmitting a probing response message to the TP over the first spectrum band, the probing response message comprising probing feedback information based on the TUE's stored record of measured received signal strengths of probing beacons transmitted by other TUEs and corresponding TUE IDs.

Example 62. The method of Example 58, further comprising, in the target mode, in response to detecting an end of the last of at least one sidelink transmission from the at least one CUE over the second spectrum band, multi-casting a response message over the second spectrum band to the group, the response message indicating an end to sidelink transmission to the TUE.

Example 63. The method of Example 62, wherein the multi-cast response message indicating an end to sidelink transmission to the TUE comprises symbols transmitted at a reference power level for sidelink channel measurement at the at least one CUE.

Example 64. The method of Example 62, wherein multi-casting a response message over the second spectrum band to the group further comprises multi-casting closed-loop power control (CLPC) information for the at least one CUE.

Example 65. The method of Example 64, wherein the CLPC information for the at least one CUE comprises, for each CUE, a dynamic CLPC command indicating a signed power offset to be applied to the transmit power of the CUE.

Example 66. The method of Example 65, wherein each dynamic CLPC command comprises a code of at least two bits and there are more power decrement codes than power increment codes.

Example 67. The method of Example 64, wherein multi-casting closed-loop power control (CLPC) information for the at least one CUE comprises multi-casting the CLPC information in response to receiving, over the second spectrum band, at least one sidelink transmission associated with a given hybrid automatic repeat request (HARQ) process identifier (ID), the CLPC information for the at least one CUE comprising, for each CUE that is assisting with the given HARQ process ID and from which a sidelink transmission was not received, a dynamic CLPC command to decrease the CUE's transmit power.

Example 68. A network device comprising:
a wireless interface;
a processor operatively coupled to the wireless interface; and
a computer readable storage medium operatively coupled to the processor, the computer readable storage medium storing programming for execution by the processor, the programming comprising instructions to:
transmit, via the wireless interface, a group-specific common-parameters configuration (CPC) message over a first spectrum band to user equipments (UEs) in a cooperating group of UEs that includes a target UE (TUE) and at least one cooperating UE (CUE) configured to relay traffic, received over the first spectrum band and intended for the TUE, to the TUE via device-to-device (D2D) sidelink transmission over a second spectrum band, the group-specific CPC message comprising at least one of:
information indicating a priority class index associated with traffic to be relayed to the TUE over the second spectrum band; and
information indicating a priority class index-specific set of channel access parameters for the at least one CUE in the group to use to access a channel in the second spectrum band as frame based equipment (FBE) to relay traffic to the TUE, the priority class index-specific set of channel access parameters corresponding to the priority class index associated with traffic to be relayed to the TUE.

Example 69. The network device of Example 68, wherein the information indicating a priority class index-specific set of channel access parameters corresponding to the priority class index associated with traffic to be relayed to the TUE comprises information indicating a maximum sidelink burst length and a minimum frame period.

Example 70. The network device of Example 69, wherein the maximum sidelink burst length and the minimum frame period are each defined as an integer multiple of a transmission time unit (TTU) associated with communications in the first spectrum band.

Example 71. The network device of Example 70, wherein the TTU of the first spectrum band is a subframe duration, a slot duration or a symbol duration associated with communications in the first spectrum band.

Example 72. The network device of Example 69, wherein the group-specific CPC message further comprises information indicating a reference time point, to, to start cycles of the frame period to access a channel in the second spectrum band as FBE.

Example 73. The network device of Example 68, wherein the group-specific CPC message further comprises information indicating a length of a response message that the TUE is configured to transmit over the second spectrum band to indicate an end to sidelink transmission to the TUE.

Example 74. The network device of Example 68, wherein the group-specific CPC message further comprises information indicating a selected channel in the second spectrum band for the at least one CUE of the group to access as frame based equipment (FBE) to relay traffic to the TUE.

Example 75. The network device of Example 69, wherein the instructions further comprise instructions to determine the priority class index associated with traffic to be relayed to the TUE by mapping at least one quality of service (QoS) parameter associated with the traffic to one priority class index of a hierarchy of priority class indexes, each priority class index in the hierarchy being associated with a respective maximum sidelink burst length and a respective minimum frame period.

Example 76. The network device of Example 75, wherein, for each of at least a subset of the priority class indexes in the hierarchy, the respective minimum frame period associated with the priority class index exceeds a respective maximum channel occupancy time (MCOT) associated with the priority class index such that a respective minimum idle period between the end of the respective MCOT and the respective minimum frame period is at least 5% of the length of the respective MCOT, the respective MCOT encompassing at least the respective maximum sidelink burst length associated with the priority class index.

Example 77. The network device of Example 76, wherein for each of the priority class indexes in the hierarchy, the respective MCOT associated with the priority class index encompasses at least the respective maximum sidelink burst length, a reserved fractional symbol duration (RFSD) and a short inter-frame space (SIFS).

Example 78. The network device of Example 77, wherein for each of the priority class indexes in the hierarchy, the respective MCOT associated with the priority class index further encompasses a length of a response message that the TUE is configured to transmit over the second spectrum band to indicate an end to sidelink transmission to the TUE.

Example 79. The network device of Example 76, wherein two priority class indexes that are adjacent in the hierarchy have the same respective MCOT and different respective minimum frame periods, such that the respective minimum frame period associated with a second one of the two priority class indexes is greater than the respective minimum frame period associated with a first one of the two priority class indexes by an amount of time equal to the duration of the largest transmission time unit (TTU) associated with communications in the first spectrum band.

Example 80. The network device of Example 75, wherein the at least one QoS parameter comprises at least one of: a latency criterion and a throughput rate criterion.

Example 81. The network device of Example 68, wherein the first spectrum band is a licensed spectrum band and the second spectrum band is an unlicensed spectrum band.

Example 82. A user equipment (UE) comprising:
a wireless interface;
a processor operatively coupled to the wireless interface; and
a computer readable storage medium operatively coupled to the processor, the computer readable storage medium storing programming for execution by the processor, the programming comprising instructions for operating in a cooperation mode, in which the UE acts as a cooperating UE (CUE) in a cooperating group of UEs, the cooperation mode comprising:
receiving, via the wireless interface, a group-specific common-parameters configuration (CPC) message from a transmit point (TP) over a first spectrum band, the group-specific CPC message comprising information related to a priority class index associated with traffic intended for a target UE (TUE) in the group;
receiving traffic intended for the TUE from the TP over the first spectrum band; and
accessing the second spectrum band as FBE in accordance with a priority class index-specific set of channel access parameters corresponding to the priority class index associated with the traffic intended for the TUE to relay the traffic to the TUE via device-to-device (D2D) sidelink transmission over the second spectrum band.

Example 83. The UE of Example 82, wherein the information related to a priority class index associated with traffic intended for the TUE comprises at least one of:
the priority class index associated with the traffic intended for the TUE; and
at least a subset of the channel access parameters of the priority class index-specific set of channel access parameters.

Example 84. The UE of Example 82, wherein the group-specific CPC message further comprises information indicating a selected channel in the second spectrum band for CUEs in the group to access as frame based equipment (FBE) to relay traffic to the TUE.

Example 85. The UE of Example 82, wherein the priority class index-specific set of channel access parameters corresponding to the priority class index associated with traffic intended for the TUE comprises a maximum sidelink burst length parameter and a minimum frame period parameter.

Example 86. The UE of Example 85, wherein:
the group-specific CPC message further comprises information indicating a reference time point, $t_0$, to start cycles of the frame period for accessing the second spectrum band as FBE; and
operating in the cooperation mode further comprises setting the frame period for accessing the second spectrum band as FBE according to the minimum frame period parameter and starting a cycle of the frame period at the reference time point, $t_0$.

Example 87. The UE of Example 86, accessing the second spectrum band as FBE comprises starting a clear channel assessment (CCA) process at a predetermined amount of time in advance of a start time of a cycle of the frame period for accessing the second spectrum band as FBE.

Example 88. The UE of Example 87, wherein accessing the second spectrum band as FBE further comprises:
in response to the CCA process indicating that a channel in the second spectrum band that has been assigned to the group is available, transmitting, via the wireless interface, a sidelink burst over the available channel in the second spectrum band in accordance with the maximum sidelink burst length parameter, the sidelink burst including at least a portion of the received traffic intended for the TUE.

Example 89. The UE of Example 88, wherein operating in the cooperation mode further comprises:
receiving traffic intended for the TUE from at least one other TP over the first spectrum band, wherein transmitting, over the available channel in the second spectrum band, a sidelink burst in accordance with the maximum sidelink burst length parameter comprises either augmenting the traffic received from different TPs in the payload of the sidelink burst or multiplexing the traffic received from different TPs in the frequency domain or the time domain.

Example 90. The UE of Example 88, wherein the sidelink burst spans a majority of the bandwidth of the available channel and is orthogonal to other in-group synchronous sidelink bursts transmitted by other CUEs in the group.

Example 91. The UE of Example 87, wherein accessing the second spectrum band as FBE further comprises:
in response to the CCA process indicating that a channel in the second spectrum band that has been assigned to the group is not available, restarting the CCA process at the predetermined amount of time in advance of the start time of the next cycle of the frame period.

Example 92. The UE of Example 82, wherein the programming further comprises instructions for operating in a target mode, in which the UE acts as a target UE (TUE) in a cooperating group of UEs that includes the TUE and at least one cooperating UE (CUE), the instructions for operating in a target mode comprising instructions to:
detect an end of the last of at least one sidelink transmission from the at least one CUE over the second spectrum band; and
in response to detecting the end of the last sidelink transmission, multi-cast a message over the second spectrum band to the group to indicate an end to sidelink transmission to the TUE.

Example 93. The UE of Example 92, wherein the multi-cast response message indicating an end to sidelink transmission to the TUE comprises symbols transmitted at a reference power level for sidelink channel measurement at the at least one CUE.

Example 94. The UE of Example 92, wherein the instructions to multi-cast a response message over the second spectrum band to the group further comprise instructions to multi-cast closed-loop power control (CLPC) information for the at least one CUE.

Example 95. The UE of Example 94, wherein the CLPC information for the at least one CUE comprises, for each CUE, a dynamic CLPC command indicating a signed power offset to be applied to the transmit power of the CUE.

Example 96. A method in a transmit point (TP) of a wireless communication network, the method comprising:
broadcasting, over a first spectrum band, a probing beacon request message that identifies a target user equipment (TUE) and a granted time instant, the probing beacon request message acting as an instruction to the TUE to transmit a probing beacon on a channel in a second spectrum band at the granted time instant and acting as an instruction to candidate cooperating UEs to measure and store a received signal strength of the probing beacon transmitted by the TUE at the granted time instant.

Example 97. The method of Example 96, further comprising receiving a probing beacon message from a network node over a backhaul connection, wherein broadcasting the probing beacon request message over the first spectrum band comprises encoding the probing beacon message received from the network node to generate the probing beacon request message and transmitting the probing beacon request message over the first spectrum band.

Example 98. The method of Example 96, further comprising, for a cooperating group of UEs that includes the TUE and at least one cooperating UE (CUE) configured to relay traffic, received over the first spectrum band and intended for the TUE, to the TUE via device-to-device (D2D) sidelink transmission over the second spectrum band, transmitting a probing beacon feedback polling message, over the first spectrum band, to the at least one CUE, the probing beacon feedback polling message requesting the at least one CUE to provide probing feedback information indicating received signal strengths of probing beacons transmitted by TUEs, including the TUE of the instant cooperating group of UEs, and corresponding TUE identifiers (TUE IDs).

Example 99. The method of Example 98, further comprising receiving a polling message from a network node over a backhaul connection, wherein transmitting the probing beacon feedback polling message over the first spectrum band to the at least one CUE comprises encoding the polling message received from the network node to generate the probing beacon feedback polling message and transmitting the probing beacon feedback polling message over the first spectrum band.

Example 100. The method of Example 99, further comprising:
receiving probing feedback information from at least one CUE over the first spectrum band; and
transmitting the probing feedback information to the network node over the backhaul connection.

Example 101. The method of Example 96, wherein the first spectrum band is a licensed spectrum band and the second spectrum band is an unlicensed spectrum band.

Example 102. The method of Example 96, wherein the candidate cooperating UEs are configured to access the second spectrum band as frame based equipment (FBE).

Example 103. The method of Example 96, wherein the candidate cooperating UEs are configured to access the second spectrum band as load based equipment (LBE).

Example 104. A method in user equipment (UE), the method comprising:
  in a cooperation mode, in which the UE acts as a cooperating UE (CUE) in a cooperating group of UEs for a target UE (TUE):
    in response to receiving a probing beacon request message from a transmit point (TP) over a first spectrum band, the probing beacon request message identifying the TUE and a granted time instant, measuring a received signal strength of a probing beacon transmitted by the TUE on a channel in the second spectrum band at the granted time instant.

Example 105. The method of Example 104, further comprising:
  in response to receiving a probing beacon feedback polling message from the TP over the first spectrum band, transmitting a probing response message to the TP over the first spectrum band, the probing response message comprising probing feedback information indicating received signal strengths of probing beacons transmitted by TUEs, including the TUE of the instant cooperating group of UEs, and corresponding TUE identifiers (TUE IDs).

Example 106. The method of Example 105, further comprising:
  receiving a group-specific common-parameters configuration (CPC) message from the TP over the first spectrum band, the group-specific CPC message comprising information indicating a channel in the second spectrum band allocated to the cooperating group of UEs to use for device-to-device (D2D) sidelink transmission to the TUE over the second spectrum band.

Example 107. The method of Example 106, wherein the UE is configured to access the second spectrum band as frame based equipment (FBE).

Example 108. The method of Example 106, wherein the UE is configured to access the second spectrum band as load based equipment (LBE).

Example 109. The method of Example 104, further comprising:
  in a target mode, in which the UE acts a target UE (TUE) in a cooperating group of UEs that includes the TUE and at least one cooperating UE (CUE):
    in response to receiving a probing beacon request message from a TP over the first spectrum band, the probing beacon request message including information indicating grant of a time instant to the TUE to transmit a probing beacon on a channel in the second spectrum band, attempting to access the channel in the second spectrum band by initiating a clear channel assessment (CCA) a predetermined time in advance of the granted time instant; and
    in response to the CCA indicating that the channel is available, transmitting the probing beacon on the channel in the second spectrum band at the granted time instant.

Example 110. The method of Example 109, wherein, in the target mode, in response to the CCA indicating that the channel is not available, transmitting a rescheduling request to the TP over the first spectrum band, the rescheduling request requesting that the TUE's granted time instant for transmission of the probing beacon be rescheduled.

Example 111. The method of Example 109, further comprising, in the target mode, in response to receiving a probing beacon request message from the TP over the first spectrum band, the probing beacon request message indicating grant of a time instant to another TUE to transmit a probing beacon on a channel in the second spectrum band:
  measuring a received signal strength of a probing beacon transmitted by the other TUE on the channel in the second spectrum band at the granted time instant; and
  storing a record of measured received signal strengths of probing beacons transmitted by other TUEs and corresponding TUE IDs.

Example 112. The method of Example 111, further comprising, in the target mode, in response to receiving a probing beacon feedback polling message from the TP over the first spectrum band, transmitting a probing response message to the TP over the first spectrum band, the probing response message comprising probing feedback information indicating received signal strengths of probing beacons transmitted by other TUEs and the corresponding TUE IDs.

Example 113. The method of Example 104, wherein the first spectrum band is a licensed spectrum band and the second spectrum band is an unlicensed spectrum band.

Example 114. A method in user equipment (UE), the method comprising:
  in a target mode, in which the UE acts a target UE (TUE) in a cooperating group of UEs that includes the TUE and at least one cooperating UE (CUE):
    in response to receiving a probing beacon request message from a TP over a first spectrum band, the probing beacon request message including information indicating grant of a time instant to the TUE to transmit a probing beacon on a channel in the second spectrum band, attempting to access the channel in the second spectrum band by initiating a clear channel assessment (CCA) a predetermined time in advance of the granted time instant; and
    in response to the CCA indicating that the channel is available, broadcasting the probing beacon on the channel in the second spectrum band at the granted time instant.

Example 115. The method of Example 114, wherein, in the target mode, in response to the CCA indicating that the channel is not available, transmitting a rescheduling request to the TP over the first spectrum band, the rescheduling request requesting that the TUE's granted time instant for transmission of the probing beacon be rescheduled.

Example 116. The method of Example 114, further comprising, in the target mode, in response to receiving a probing beacon request message from the TP over the first spectrum band, the probing beacon request message indicating grant of a time instant to another TUE to broadcast a probing beacon on a channel in the second spectrum band:
  measuring a received signal strength of a probing beacon broadcasted by the other TUE on the channel in the second spectrum band at the granted time instant; and
  storing a record of measured received signal strengths of probing beacons broadcasted by other TUEs and corresponding TUE IDs.

Example 117. The method of Example 116, further comprising, in the target mode, in response to receiving a probing beacon feedback polling message from the TP over the first spectrum band, transmitting a probing response message to the TP over the first spectrum band, the probing response message comprising probing feedback information indicating received signal strengths of probing beacons broadcasted by other TUEs and the corresponding TUE IDs.

Example 118. The method of Example 114, wherein the first spectrum band is a licensed spectrum band and the second spectrum band is an unlicensed spectrum band.

Example 119. A network device comprising:
a wireless interface;
a processor operatively coupled to the wireless interface;
and a computer readable storage medium operatively coupled to the processor, the computer readable storage medium storing programming for execution by the processor, the programming comprising instructions to:
broadcast, over a first spectrum band, a probing beacon request message that identifies a target user equipment (TUE) and a granted time instant, the probing beacon request message acting as an instruction to the TUE to transmit a probing beacon on a channel in a second spectrum band at the granted time instant and acting as an instruction to candidate cooperating UEs to measure and store a received signal strength of the probing beacon transmitted by the TUE at the granted time instant.

Example 120. The network device of Example 119, further comprising a communications interface configured to communicate over a backhaul connection, wherein the programming further comprises instructions to:
receive, via the communications interface, a probing beacon message from a network node over the backhaul connection, wherein the instructions to broadcast the probing beacon request message over the first spectrum band comprise instructions to encode the probing beacon message received from the network node to generate the probing beacon request message and transmit the probing beacon request message over the first spectrum band.

Example 121. The network device of Example 119, wherein the programming further comprises instructions to:
transmit a probing beacon feedback polling message, over the first spectrum band, to the at least one CUE, the probing beacon feedback polling message requesting the at least one CUE to provide probing feedback information indicating received signal strengths of probing beacons transmitted by TUEs, including the TUE of the instant cooperating group of UEs, and corresponding TUE identifiers (TUE IDs).

Example 122. The network device of Example 121, further comprising a communications interface configured to communicate over a backhaul connection, wherein the instructions to transmit the probing beacon feedback polling message over the first spectrum band to the at least one CUE comprise instructions to encode a polling message received from a network node over a backhaul connection via the communications interface to generate the probing beacon feedback polling message and transmit the probing beacon feedback polling message over the first spectrum band.

Example 123. The network device of Example 122, wherein the programming further comprises instructions to transmit, via the communications interface, probing feedback information, received via the wireless interface from at least one CUE over the first spectrum band, to the network node over the backhaul connection.

Example 124. The network device of Example 119, wherein the first spectrum band is a licensed spectrum band and the second spectrum band is an unlicensed spectrum band.

Example 125. A user equipment (UE) comprising:
a wireless interface;
a processor operatively coupled to the wireless interface;
and a computer readable storage medium operatively coupled to the processor, the computer readable storage medium storing programming for execution by the processor, the programming comprising instructions for operating in a cooperation mode, in which the UE acts as a cooperating UE (CUE) in a cooperating group of UEs, the cooperation mode comprising:
in response to receiving, via the wireless interface, a probing beacon request message broadcast by a transmit point (TP) over a first spectrum band, the probing beacon request message identifying a target UE (TUE) and a granted time instant, measuring a received signal strength of a probing beacon transmitted by the TUE on a channel in the second spectrum band at the granted time instant.

Example 126. The UE of Example 125, wherein operating in the cooperation mode further comprises:
in response to receiving, via the wireless interface, a probing beacon feedback polling message from the TP over the first spectrum band, transmitting, via the wireless interface, a probing response message to the TP over the first spectrum band, the probing response message comprising probing feedback information indicating received signal strengths of probing beacons transmitted by TUEs, including the TUE of the instant cooperating group of UEs, and corresponding TUE identifiers (TUE IDs).

Example 127. The UE of Example 126, wherein operating in the cooperation mode further comprises:
receiving, via the wireless interface, a group-specific common-parameters configuration (CPC) message from the TP over the first spectrum band, the group-specific CPC message comprising information indicating a channel in the second spectrum band allocated to the cooperating group of UEs to use for device-to-device (D2D) sidelink transmission to the TUE over the second spectrum band.

Example 128. The UE of Example 127, wherein the UE is configured to access the second spectrum band as frame based equipment (FBE).

Example 129. The UE of Example 127, wherein the UE is configured to access the second spectrum band as load based equipment (LBE).

Example 130. The UE of Example 125, wherein the programming further comprises instructions for operating in a target mode, in which the UE acts as a target UE (TUE) in a cooperating group of UEs that includes the TUE and at least one cooperating UE (CUE), the target mode comprising:
in response to receiving, via the wireless interface, a probing beacon request message from a TP over the first spectrum band, the probing beacon request message including information indicating grant of a time instant to the TUE to transmit a probing beacon on a channel in the second spectrum band, initiating a clear channel assessment (CCA) a predetermined time in advance of the granted time instant; and
in response to the CCA indicating that the channel is available, transmitting, via the wireless interface, the probing beacon on the channel in the second spectrum band at the granted time instant.

Example 131. The UE of Example 13o, wherein operating in the target mode further comprises:
in response to the CCA indicating that the channel is not available, transmitting, via the wireless interface, a rescheduling request to the TP over the first spectrum band, the rescheduling request requesting that the TUE's granted time instant for transmission of the probing beacon be rescheduled.

Example 132. The UE of Example 130, wherein operating in the target mode further comprises:
in response to receiving, via the wireless interface, a probing beacon request message from the TP over the first spectrum band, the probing beacon request message indicating grant of a time instant to another TUE to transmit a probing beacon on a channel in the second spectrum band:
measuring a received signal strength of a probing beacon transmitted by the other TUE on the channel in the second spectrum band at the granted time instant; and
storing a record of measured received signal strengths of probing beacons transmitted by other TUEs and corresponding TUE IDs.

Example 133. The UE of Example 132, wherein operating in the target mode further comprises:
in response to receiving, via the wireless interface, a probing beacon feedback polling message from the TP over the first spectrum band, transmitting, via the wireless interface, a probing response message to the TP over the first spectrum band, the probing response message comprising probing feedback information indicating received signal strengths of probing beacons transmitted by other TUEs and the corresponding TUE IDs.

Example 134. The UE of Example 125, wherein the first spectrum band is a licensed spectrum band and the second spectrum band is an unlicensed spectrum band.

Example 135. A user equipment (UE) comprising:
a wireless interface;
a processor operatively coupled to the wireless interface; and
a computer readable storage medium operatively coupled to the processor, the computer readable storage medium storing programming for execution by the processor, the programming comprising instructions for operating in a target mode, in which the UE acts a target UE (TUE) in a cooperating group of UEs that includes the TUE and at least one cooperating UE (CUE), the target mode comprising:
in response to receiving, via the wireless interface, a probing beacon request message from a TP over a first spectrum band, the probing beacon request message including information indicating grant of a time instant to the TUE to transmit a probing beacon on a channel in the second spectrum band, initiating a clear channel assessment (CCA) a predetermined time in advance of the granted time instant; and
in response to the CCA indicating that the channel is available, broadcasting the probing beacon on the channel in the second spectrum band at the granted time instant.

Example 136. The UE of Example 135, wherein operating in the target mode further comprises:
in response to the CCA indicating that the channel is not available, transmitting, via the wireless interface, a rescheduling request to the TP over the first spectrum band, the rescheduling request requesting that the TUE's granted time instant for transmission of the probing beacon be rescheduled.

Example 137. The UE of Example 114, wherein operating in the target mode further comprises:
in response to receiving, via the wireless interface, a probing beacon request message from the TP over the first spectrum band, the probing beacon request message indicating grant of a time instant to another TUE to broadcast a probing beacon on a channel in the second spectrum band:
measuring a received signal strength of a probing beacon broadcasted by the other TUE on the channel in the second spectrum band at the granted time instant; and
storing a record of measured received signal strengths of probing beacons broadcasted by other TUEs and corresponding TUE IDs.

Example 138. The UE of Example 137, wherein operating in the target mode further comprises:
in response to receiving, via the wireless interface, a probing beacon feedback polling message from the TP over the first spectrum band, transmitting, via the wireless interface, a probing response message to the TP over the first spectrum band, the probing response message comprising probing feedback information indicating received signal strengths of probing beacons broadcasted by other TUEs and the corresponding TUE IDs.

Example 139. The UE of Example 135, wherein the first spectrum band is a licensed spectrum band and the second spectrum band is an unlicensed spectrum band.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for user equipment (UE) operation, the method comprising:
receiving one or more higher layer configuration messages over a first spectrum band, the one or more higher layer configuration messages both configuring a cooperating UE (CUE) for a target UE (TUE) and configuring the CUE to access a second spectrum band at periodic instants in accordance with semi-static channel access parameters;
receiving, by the CUE, a transmission of a transmit block (TB) for the TUE from a serving cell over the first spectrum band;
accessing, by the CUE, a frequency channel of the second spectrum band at one of the periodic instants in accordance with the semi-static channel access parameters; and in response thereto
transmitting, by the CUE, a device-to-device (D2D) sidelink transmission carrying the TB to the TUE over the frequency channel of the second spectrum band.

2. The method of claim 1, wherein the CUE accesses the frequency channel of the second spectrum band following a processing delay after an ending symbol of the transmission of the TB, the processing delay associated with a capability of the CUE.

3. The method of claim 1, wherein the first spectrum band is a licensed spectrum band and the second spectrum band is a shared spectrum band.

4. The method of claim 1, wherein the one or more higher layer configuration messages include an indication of a frequency channel that the CUE used to access the second spectrum band.

5. The method of claim 1, wherein the one or more higher layer configuration messages include a periodicity parameter that the CUE used to determine the periodic instants.

6. The method of claim 1, wherein accessing the frequency channel of the second spectrum band during the periodic instant comprises sensing that the frequency channel of the second spectrum band is idle during a sensing slot duration, and
wherein transmitting the D2D sidelink transmission carrying the TB to the TUE comprises transmitting the D2D sidelink transmission carrying the TB during a channel occupancy time associated with the sensing slot duration.

7. The method of claim 6, wherein accessing the frequency channel of the second spectrum band during the periodic instant comprises sensing that the frequency channel of the second spectrum band is busy during a first sensing slot duration and sensing that the frequency channel of the second spectrum band is idle during a second sensing slot duration that is after the first sensing slot duration, and
wherein transmitting the D2D sidelink transmission carrying the TB to the TUE comprises deferring transmission of the D2D sidelink transmission carrying the TB until a channel occupancy time associated with the second sensing slot duration such that the D2D sidelink transmission carrying the TB is not transmitted during a channel occupancy time associated with the first sensing slot duration.

8. The method of claim 1, wherein the CUE is a network-to-UE relay for the TUE, the CUE relaying the TB to the TUE using at least one an amplify-and-forward (AF) relay operation, a decode-and-forward (DF) relay operation, a compress-and-forward (CF) relay operation, a frequency-selective soft-forwarding (SF) relay operation, or a joint reception (JR) relay operation.

9. The method of claim 1, further comprising:
receiving a probing beacon broadcast signal from the TUE via a dedicated probing channel, the probing beacon broadcast signal having at least one of a fixed transmit power per subcarrier, a fixed transport format, or a physical resource element (RE) configuration that is that is a priori information of the CUE.

10. The method of claim 9, wherein the dedicated probing channel is reserved exclusively for the communication of probing beacon broadcast signals such other types of D2D signaling are not communicated over the dedicated probing channel.

11. A cooperating user equipment (CUE) comprising:
a processor; and a non-transitory computer readable storage medium storing programming for execution by the processor, the programming including instructions to:
receive one or more higher layer configuration messages over a first spectrum band, the one or more higher layer configuration messages both configuring the CUE for a target user equipment (TUE) and configuring the CUE to access a second spectrum band at periodic instants in accordance with semi-static channel access parameters;
receive a transmission of a transmit block (TB) for the TUE from a serving cell over the first spectrum band;
access a frequency channel of the second spectrum band at one of the periodic instants in accordance with the semi-static channel access parameters; and
in response thereto
transmit a device-to-device (D2D) sidelink transmission carrying the TB to the TUE over the frequency channel of the second spectrum band.

12. The CUE of claim 11, wherein the CUE accesses the frequency channel of the second spectrum band following a processing delay after an ending symbol of the transmission of the TB, the processing delay associated with a capability of the CUE.

13. The CUE of claim 11, wherein the first spectrum band is a licensed spectrum band and the second spectrum band is a shared spectrum band.

14. The CUE of claim 11, wherein the one or more higher layer configuration messages include an indication of a frequency channel that the CUE used to access the second spectrum band.

15. The CUE of claim 11, wherein the one or more higher layer configuration messages include a periodicity parameter that the CUE used to determine the periodic instants.

16. The CUE of claim 11, wherein the instructions to access the frequency channel of the second spectrum band during the periodic instant include instructions to sense that the frequency channel of the second spectrum band is idle during a sensing slot duration, and
wherein the instructions to transmit the D2D sidelink transmission carrying the TB to the TUE include instructions to transmit the D2D sidelink transmission carrying the TB during a channel occupancy time associated with the sensing slot duration.

17. The CUE of claim 16, wherein the instructions to access the frequency channel of the second spectrum band during the periodic instant include instructions to sense that the frequency channel of the second spectrum band is busy during a first sensing slot duration and to sense that the frequency channel of the second spectrum band is idle during a second sensing slot duration that is after the first sensing slot duration, and
wherein the instructions to transmit the D2D sidelink transmission carrying the TB to the TUE include instructions to defer transmission of the D2D sidelink transmission carrying the TB until a channel occupancy time associated with the second sensing slot duration such that the D2D sidelink transmission carrying the TB is not transmitted during a channel occupancy time associated with the first sensing slot duration.

18. The CUE of claim 11, wherein the CUE is a network-to-UE relay for the TUE, the CUE relaying the TB to the TUE using at least one an amplify-and-forward (AF) relay operation, a decode-and-forward (DF) relay operation, a compress-and-forward (CF) relay operation, a frequency-selective soft-forwarding (SF) relay operation, or a joint reception (JR) relay operation.

19. The CUE of claim 11, wherein the programming further includes instructions to:
receive a probing beacon broadcast signal from the TUE via a dedicated probing channel, the probing beacon broadcast signal having at least one of a fixed transmit power per subcarrier, a fixed transport format, or a physical resource element (RE) configuration that is that is a priori information of the CUE.

20. The CUE of claim 19, wherein the dedicated probing channel is reserved exclusively for the communication of probing beacon broadcast signals such other types of D2D signaling are not communicated over the dedicated probing channel.

* * * * *